(12) United States Patent
Lee et al.

(10) Patent No.: US 10,296,261 B2
(45) Date of Patent: May 21, 2019

(54) ELECTRONIC DEVICE COMPENSATING DIFFERENT CHARACTERISTICS OF SERIALLY CONNECTED STORAGE DEVICES AND STORAGE DEVICE INCLUDED THEREIN

(71) Applicant: Samsung Electronics Co., Ltd., Suwon-si, Gyeonggi-do (KR)

(72) Inventors: Youngmin Lee, Seoul (KR); Sungho Seo, Seoul (KR); Hyuntae Park, Suwon-si (KR); Hwaseok Oh, Yongin-si (KR); JinHyeok Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 57 days.

(21) Appl. No.: 15/702,035

(22) Filed: Sep. 12, 2017

(65) Prior Publication Data

US 2018/0081595 A1    Mar. 22, 2018

(30) Foreign Application Priority Data

Sep. 22, 2016 (KR) .................. 10-2016-0121638

(51) Int. Cl.
*G06F 3/06* (2006.01)

(52) U.S. Cl.
CPC .......... *G06F 3/0659* (2013.01); *G06F 3/0604* (2013.01); *G06F 3/0626* (2013.01); *G06F 3/0656* (2013.01); *G06F 3/0683* (2013.01); *G06F 3/067* (2013.01)

(58) Field of Classification Search
None
See application file for complete search history.

(56) References Cited

U.S. PATENT DOCUMENTS

| | | |
|---|---|---|
| 5,463,772 A | 10/1995 | Thompson et al. |
| 6,378,018 B1 | 4/2002 | Tsern |
| 7,246,252 B1 | 7/2007 | Gupta et al. |
| 8,630,182 B2 | 1/2014 | Radke et al. |
| 2005/0138184 A1 | 6/2005 | Amir |
| 2009/0063786 A1 | 3/2009 | Oh |
| 2014/0281172 A1 | 9/2014 | Seo et al. |
| 2015/0349534 A1 | 12/2015 | Lin |
| 2015/0350086 A1 | 12/2015 | Mullendore et al. |
| 2016/0034413 A1 | 2/2016 | Park |
| 2016/0043755 A1 | 2/2016 | Kim et al. |
| 2016/0127173 A1 | 5/2016 | Gagnon et al. |

*Primary Examiner* — Brian R Peugh
(74) *Attorney, Agent, or Firm* — Harness, Dickey & Pierce, P.L.C.

(57) ABSTRACT

An electronic device includes an embedded storage device and an application processor. The embedded storage device is connected to directly communicate with a removable storage device which processes a packet having a first characteristic. The embedded storage device processes a packet having a second characteristic. The application processor is connected to directly communicate with the embedded storage device, but not directly connected to the removable storage device. The application processor processes a packet having a third characteristic. The embedded storage device compensates at least one of the first characteristic or the second characteristic, such that at least one of a first packet of the first characteristic received from the removable storage device or a second packet of the second characteristic in the embedded storage device is provided to the application processor according to the third characteristic.

20 Claims, 21 Drawing Sheets

ELECTRONIC DEVICE COMPENSATING DIFFERENT CHARACTERISTICS OF SERIALLY CONNECTED STORAGE DEVICES AND STORAGE DEVICE INCLUDED THEREIN

CROSS-REFERENCE TO RELATED APPLICATIONS

The present application claims priority under 35 U.S.C. § 119 to Korean Patent Application No. 10-2016-0121638, filed on Sep. 22, 2016, in Korean Intellectual Property Office, the entire contents of which are incorporated herein by reference.

BACKGROUND

The example embodiments of the inventive concepts relate to communication between electronic circuits or devices, and more particularly, relate to configurations and operations that manage and/or process a packet and information for interface between electronic circuits and/or devices.

Various types of electronic devices are used. An electronic device performs a function(s) according to an operation of one or more electronic circuits included therein. The electronic device provides service(s) to a user by performing the function(s). The electronic device may operate solely to provide the service(s). Some electronic devices may communicate with other electronic device(s) or external electronic circuit(s) to provide the service(s).

An operation processor and a storage device are some examples of electronic devices. For example, the operation processor may communicate (e.g., interface) with the storage device to provide a data storage service to a user. The operation processor may exchange a data/information/signal/and/or packet with the storage device while interfacing with the storage device. The operation processor and the storage device may employ an interface protocol to communicate with each other.

Configurations and manners of interface of electronic devices have evolved. For example, various circuit configurations and various methods of operating circuits have been developed to implement storage devices having a large capacity. However, in some cases, changing circuit configurations and methods of operating a circuit to satisfy, or improve on, a user's demand or desirability may cause an increase in cost, configuration complexity, and/or circuit area.

SUMMARY

The example embodiments may provide an electronic device which is capable of satisfying a user's demand with low complexity. The electronic device according to the example embodiments may provide configurations and operations for compensating different characteristics of a plurality of devices.

In some example embodiments, an electronic device may include an embedded storage device and an application processor. The embedded storage device may be connected with and directly communicate with a removable storage device which may process a packet having a first characteristic. The embedded storage device may process a packet having a second characteristic. The application processor may be connected to and directly communicate with the embedded storage device, but may not be directly connected with the removable storage device. The application processor may process a packet having a third characteristic. The embedded storage device may compensate at least one of the first characteristic or the second characteristic such that at least one of a first packet of the first characteristic received from the removable storage device or a second packet of the second characteristic in the embedded storage device is provided to the application processor according to the third characteristic.

In some example embodiments, a storage device may include a controller, a nonvolatile memory, and a compensation circuit. The controller may directly communicate with each of, or at least one of a host device and an external storage device that are not directly connected with each other. The controller may process a packet having a first characteristic. The nonvolatile memory may store or output data according to control of the controller. The compensation circuit may compensate difference among the first characteristic, a second characteristic, and a third characteristic, such that a packet of the second characteristic received from the host device, which may process the packet having the second characteristic, is transferred to the external storage device according to the third characteristic of a packet, which may be processed by the external storage device, or is processed by the controller according to the first characteristic.

In some example embodiments, an electronic system may include a plurality of electronic devices, the plurality of electronic devices being configured to connect to one another and being configured to communicate with one another, the plurality of electronic devices including an interfacing electronic device, a designated electronic device, and a tail electronic device, the tail electronic device directly connected to one of the plurality of electronic devices and not directly connected to another of the plurality of electronic devices. The electronic system may include a processor directly connected to the tail electronic device and being configured to communicate with the interfacing electronic devices, the interfacing electronic device being configured to process a packet having a first characteristic, the designated electronic device configured to process a packet having a second characteristic, the processor being configured to process a packet having a third characteristic. The designated electronic device is further configured to compensate at least one of the first characteristic or the second characteristic, such that at least one of a first packet of the first characteristic received from the interfacing electronic device or a second packet of the second characteristic from the designated electronic device is provided to the processor according to the third characteristic.

According to the example embodiments, design/manufacturing costs and configuration complexity of the electronic device may decrease. Accordingly, the example embodiments may bring some economic benefit while satisfying some of a user's demand. In some example embodiments, different operation manners of a plurality of devices having different characteristics may be compensated. Accordingly, implementing one communication channel, instead of implementing a plurality of communication channels, for the plurality of devices may be possible. Design and/or manufacturing costs and/or configuration complexity of the electronic device may further decrease, or be improved.

BRIEF DESCRIPTION OF THE DRAWINGS

The above and other objects and features will become apparent from the following description with reference to the following figures, wherein like reference numerals refer to like parts throughout the various figures unless otherwise specified.

DETAILED DESCRIPTION OF EXAMPLE EMBODIMENTS

Below, example embodiments of the inventive concepts will be described in detail and clearly with reference to accompanied drawings to such an extent that those (hereinafter referred to as "ordinary ones") skilled in the art can readily implement the inventive concepts.

Figure 1:
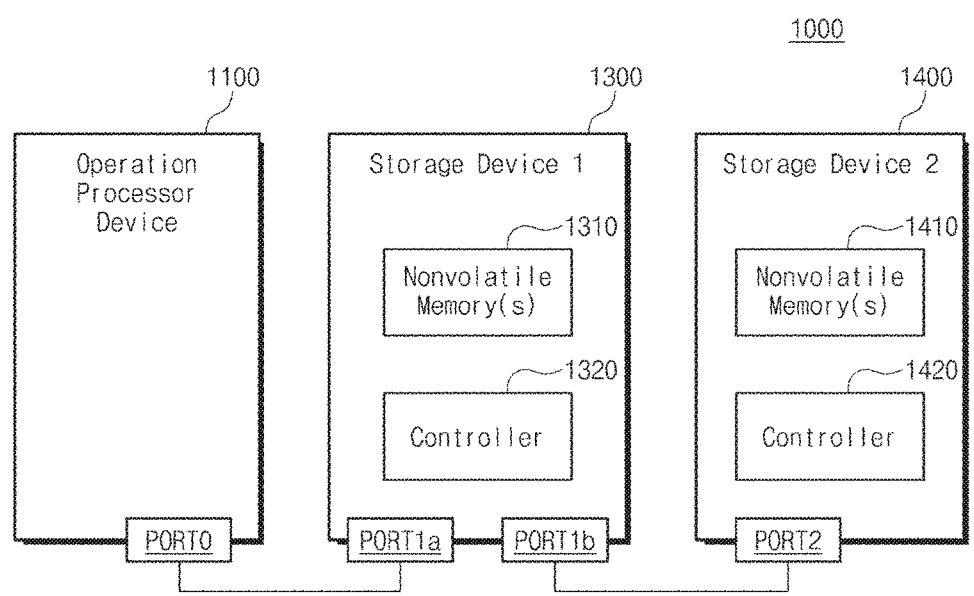
FIG. 1 is a block diagram illustrating a storage system that includes storage devices serially connected according to some example embodiments.

FIG. 1 is a block diagram illustrating a storage system that includes storage devices serially connected according to some example embodiments. A storage system 1000 may include an operation processor device 1100, a first storage device 1300, and a second storage device 1400.

The operation processor device 1100 may perform various arithmetic operations and/or logic operations to manage and process overall operations of the storage system 1000. For example, the operation processor device 1100 may be implemented in a special-purpose circuit (e.g., field programmable gate arrays (FPGA), application specific integrated circuits (ASICs), and/or the like) including one or more processor cores, or may be implemented in a system on chip (SoC). For example, the operation processor device 1100 may include a general-purpose processor, a special-purpose processor, and/or an application processor. The operation processor device 1100 may be a processor itself, or may be an electronic device or system including a processor. Likewise, the term "processor" may include an operation processor, an application processor, and/or other electronic device.

The first storage device 1300 may include one or more nonvolatile memories 1310 and a controller 1320. The second storage device 1400 may include one or more nonvolatile memories 1410 and a controller 1420.

The nonvolatile memories 1310 and 1410 may include memory areas for storing data. For example, the nonvolatile memories 1310 and 1410 may include one or more of various nonvolatile memories such as a NAND-type flash memory, a phase-change random access memory (PRAM), a magneto-resistive RAM (MRAM), a resistive RAM (RRAM), a ferro-electric RAM (FRAM), and/or the like.

The controllers 1320 and 1420 may control overall operations of the storage devices 1300 and 1400 respectively. To this end, each of, or at least one of the controllers 1320 and 1420 may include one or more processor cores, and a buffer memory. For example, the controllers 1320 and 1420 may control the nonvolatile memories 1310 and 1410 respectively such that data is stored in the nonvolatile memories 1310 and 1410 or data stored in the nonvolatile memories 1310 and 1410 is output.

The operation processor device 1100 may provide a command, a query, and/or a request to the storage devices 1300 and 1400. The operation processor device 1100 may exchange data with the storage devices 1300 and 1400. In some example embodiments, a command, a query, a request, and data may be transferred in unit of packet, but this is not to limit the inventive concepts. A transfer unit may be variously changed or modified.

For example, when the operation processor device 1100 provides a write command and write data to the storage devices 1300 and 1400, the storage devices 1300 and 1400 may store write data in the nonvolatile memories 1310 and 1410. For example, when the operation processor device 1100 provides a read command to the storage devices 1300 and 1400, the storage devices 1300 and 1400 may output read data, which is stored in the nonvolatile memories 1310 and 1410, to the operation processor device 1100.

The operation processor device 1100 may be a host device that receives a storage service from the storage devices 1300 and 1400. The "host" may mean a device that receives a service from other device(s). A user of the storage system 1000 may receive a storage service according to an operation of the operation processor device 1100.

According to the example embodiments, the operation processor device 1100 and the storage devices 1300 and 1400 may be serially connected. Referring to FIG. 1, the operation processor device 1100 may be connected to directly communicate with the first storage device 1300 through ports PORT0 and PORT1*a*. Further, the first storage device 1300 may be connected to directly communicate with the second storage device 1400 through ports PORT1*b* and PORT2. However, the operation processor device 1100 may not be directly connected with the second storage device 1400. For example, such connection between the operation processor device 1100 and the storage devices 1300 and 1400 may be understood as the topology of a "chain" structure or a "daisy-chain" structure.

For example, the controller 1320 may be configured to directly communicate with the operation processor device 1100 to exchange read data and write data with the operation processor device 1100. For example, the controllers 1320 and 1420 may be configured to directly communicate with each other to exchange read data and write data with each other. On the other hand, the controller 1420 may not be directly connected with the operation processor device 1100.

Unlike a configuration illustrated in FIG. 1, in some cases, the operation processor device 1100 may be directly connected with both the storage devices 1300 and 1400. For example, the storage devices 1300 and 1400 may be connected in parallel with the operation processor device 1100. However, in this case, the operation processor device 1100 may include multiple ports that are connected with both the storage devices 1300 and 1400. In addition, the operation processor device 1100 may include communication circuits to communicate with the storage devices 1300 and 1400 and peripheral circuits that control and drive the communication circuits.

On the other hand, according to the example embodiment illustrated in FIG. 1, the operation processor device 1100 may not directly communicate with the second storage device 1400. Thus, the operation processor device 1100 may only include the port PORT0 connected with the first storage device 1300, a communication circuit for communicating with the first storage device 1300, and a peripheral circuit that controls and drives the communication circuit. Instead, the first storage device 1300 may include the port PORT1$b$ connected with the second storage device 1400, a communication circuit for communicating with the second storage device 1400, and a peripheral circuit that controls and drives the communication circuit.

Thus, according to the example embodiment illustrated in FIG. 1, a configuration of the operation processor device 1100 may become simplified, and an area occupied by the operation processor device 1100 may be reduced. In addition, design/manufacturing costs of the operation processor device 1100 may decrease. In addition to such economic benefits, employing two storage devices 1300 and 1400 may provide larger storage capacity in comparison to employing one storage device. Thus, a user's demand may be satisfied.

In such the example embodiment, a configuration of the first storage device 1300 may become complicated somewhat. However, in many cases, the operation processor device 1100 may operate at a speed of several or tens of gigahertz (GHz), and the first storage device 1300 may operate at a speed of tens to hundreds of megahertz (MHz). In addition, a process for manufacturing the operation processor device 1100 may be more difficult and complex than a process for manufacturing the first storage device 1300. Thus, it may be simpler and more economical to implement the port PORT1$b$, the communication circuit, and the peripheral circuit in the first storage device 1300.

The operation processor device 1100 and the storage devices 1300 and 1400 may communicate with each other in compliance with one or more of various interface protocols. For example, the operation processor device 1100 and the storage devices 1300 and 1400 may employ each of, or at least one of interface protocols such as universal serial bus (USB), small computer system interface (SCSI), peripheral component interconnect express (PCIe), nonvolatile memory express (NVMe), serial advanced technology attachment (SATA), serial attachment SCSI (SAS), secure digital (SD) card, embedded multimedia card (eMMC), universal flash storage (UFS), and/or the like, to communicate with each other. However, this example is not to limit the inventive concepts.

FIGS. 2A to 2D are conceptual diagrams illustrating example implementations of the storage system of FIG. 1.

Figure 2A:
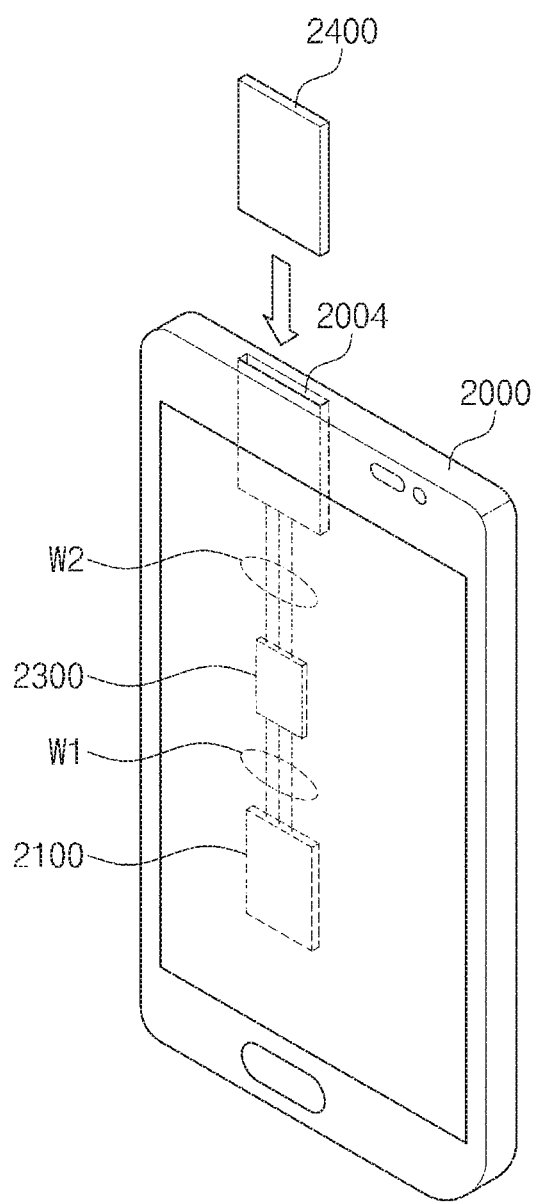
FIGS. 2A to 2D are conceptual diagrams illustrating example implementations of a storage system of FIG. 1.

Referring to FIG. 2A, the storage system 1000 of FIG. 1 may be implemented in an electronic device 2000 (e.g., a smart phone, a tablet computer, and/or the like). The electronic device 2000 may include an application processor 2100 and an embedded storage device 2300. The electronic device 2000 may include a slot 2004 to equip a removable storage device 2400. For example, the removable storage device 2400 may be implemented in the form of a card, a stick, or a chip package, and may be equipped in the slot 2004 or be detached from the slot 2004.

For example, the application processor 2100 may be connected to directly communicate with the embedded storage device 2300 through a conductive pattern W1. When the removable storage device 2400 is equipped in the slot 2004, the embedded storage device 2300 may be connected to directly communicate with the removable storage device 2400 through a conductive pattern W2. On the other hand, the removable storage device 2400 may not be directly connected with the application processor 2100.

Figure 2B:
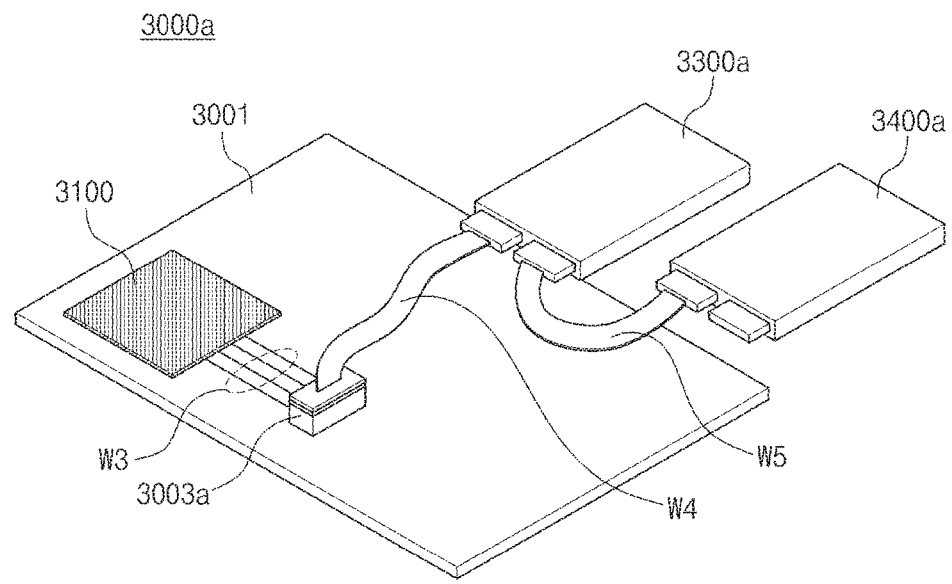
Figure 2C:
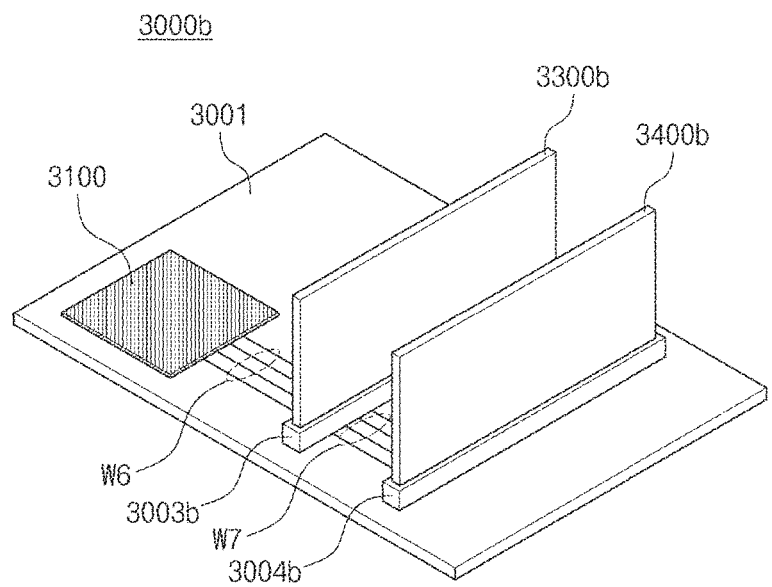
Figure 2D:
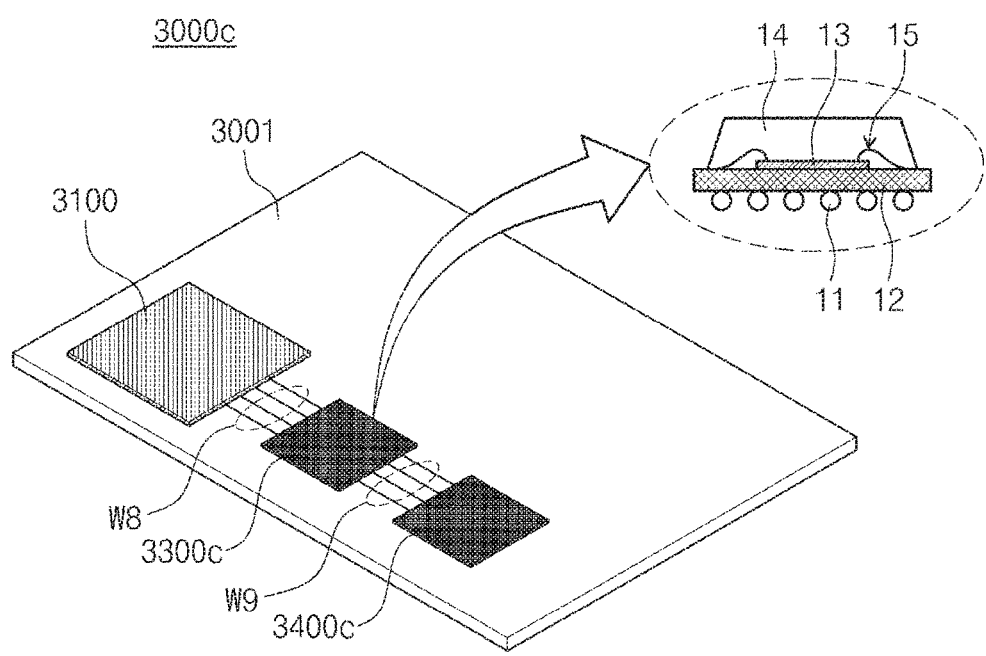

Referring to FIGS. 2B through 2D, the storage system 1000 of FIG. 1 may be implemented in a computing system 3000$a$, 3000$b$, or 3000$c$ (e.g., a desktop computer, a laptop computer, a workstation, a server system, and/or the like). The computing system 3000$a$ of FIG. 2B may include a central processing unit (CPU) 3100 and storage devices 3300$a$ and 3400$a$. The CPU 3100 may be equipped on a mainboard (or a motherboard) 3001.

For example, each of, or at least one of the storage devices 3300$a$ and 3400$a$ may be a hard disk drive (HDD) or a solid state drive (SSD) implemented in a box module. The first storage device 3300$a$ may be connected with a connector 3003$a$ on the mainboard 3001. The first storage device 3300$a$ may be connected to directly communicate with the CPU 3100 through a conductive pattern W3 and a wire cable W4. The second storage device 3400$a$ may be connected to directly communicate with the first storage device 3300$a$ through a wire cable W5. On the other hand, the second storage device 3400$a$ may not be directly connected with the CPU 3100.

The computing system 3000$b$ of FIG. 2C may include the CPU 3100 and storage devices 3300$b$ and 3400$b$. For example, each of, or at least one of the storage devices 3300$b$ and 3400$b$ may be a memory module or a SSD implemented in a card module. The first storage device 3300$b$ may be connected with a connector 3003$b$ on the mainboard 3001, and may be connected to directly communicate with the CPU 3100 through a conductive pattern W6. The second storage device 3400$b$ may be connected with a connector 3004$b$ on the mainboard 3001, and may be connected to directly communicate with the first storage device 3300$b$ through a conductive pattern W7. On the other hand, the second storage device 3400$b$ may not be directly connected with the CPU 3100.

The computing system 3000$c$ of FIG. 2D may include the CPU 3100 and storage devices 3300$c$ and 3400$c$. For example, each of, or at least one of the storage devices 3300$c$ and 3400$c$ may be an on-board SSD or a ball grid array (BGA) SSD implemented in a chip or a chip package. The first storage device 3300$c$ may be connected to directly communicate with the CPU 3100 through a conductive pattern W8, and may be connected to directly communicate with the second storage device 3400$c$ through a conductive pattern W9. On the other hand, the second storage device 3400c may not be directly connected to the CPU 3100.

For example, when the first storage device 3300c is a BGA SSD, the first storage device 3300c may include a nonvolatile memory/controller chip 13 mounted on a substrate 12. The nonvolatile memory/controller chip 13 may be connected with the conductive patterns W8 and W9 through a bonding 15, and may be covered with a mold compound 14. The first storage device 3300c may be equipped on the mainboard 3001 through solder balls 11.

In some example embodiments, each of, or at least one of the computing systems 3000a, 3000b, and 3000c may further include a working memory for temporarily storing data processed or to be processed by the CPU 3100, a communication circuit for communicating with an external device/system, and a user interface for exchanging data/information with a user. The working memory, the communication circuit, and the user interface may be equipped or mounted on the mainboard 3001, and may be connected with the CPU 3100 through conductive patterns and/or buses.

In FIG. 2A to 2D, each of, or at least one of the application processor 2100 and the CPU 3100 may correspond to the operation processor device 1100 of FIG. 1. Each of, or at least one of the embedded storage device 2300 and the first storage devices 3300a, 3300b, and 3300c may correspond to the first storage device 1300 of FIG. 1. Each of, or at least one of the removable storage device 2400 and the second storage devices 3400a, 3400b, and 3400c may correspond to the second storage device 1400 of FIG. 1. As described with reference to FIG. 1, configurations of FIGS. 2A to 2D may bring economic benefits while satisfying a user's demand.

For example, each of, or at least one of the conductive patterns W1, W2, W3, W6, W7, W8, and W9 may be conductive material formed on a printed circuit board (PCB) or the mainboard 3001. For example, each of, or at least one of the conductive patterns W1, W2, W3, W6, W7, W8, and W9 may include a wire pattern, a trace pattern, and/or the like. For example, the conductive material may be implemented with a wire, a trace, a conductive plate, and/or the like.

Figure 3:
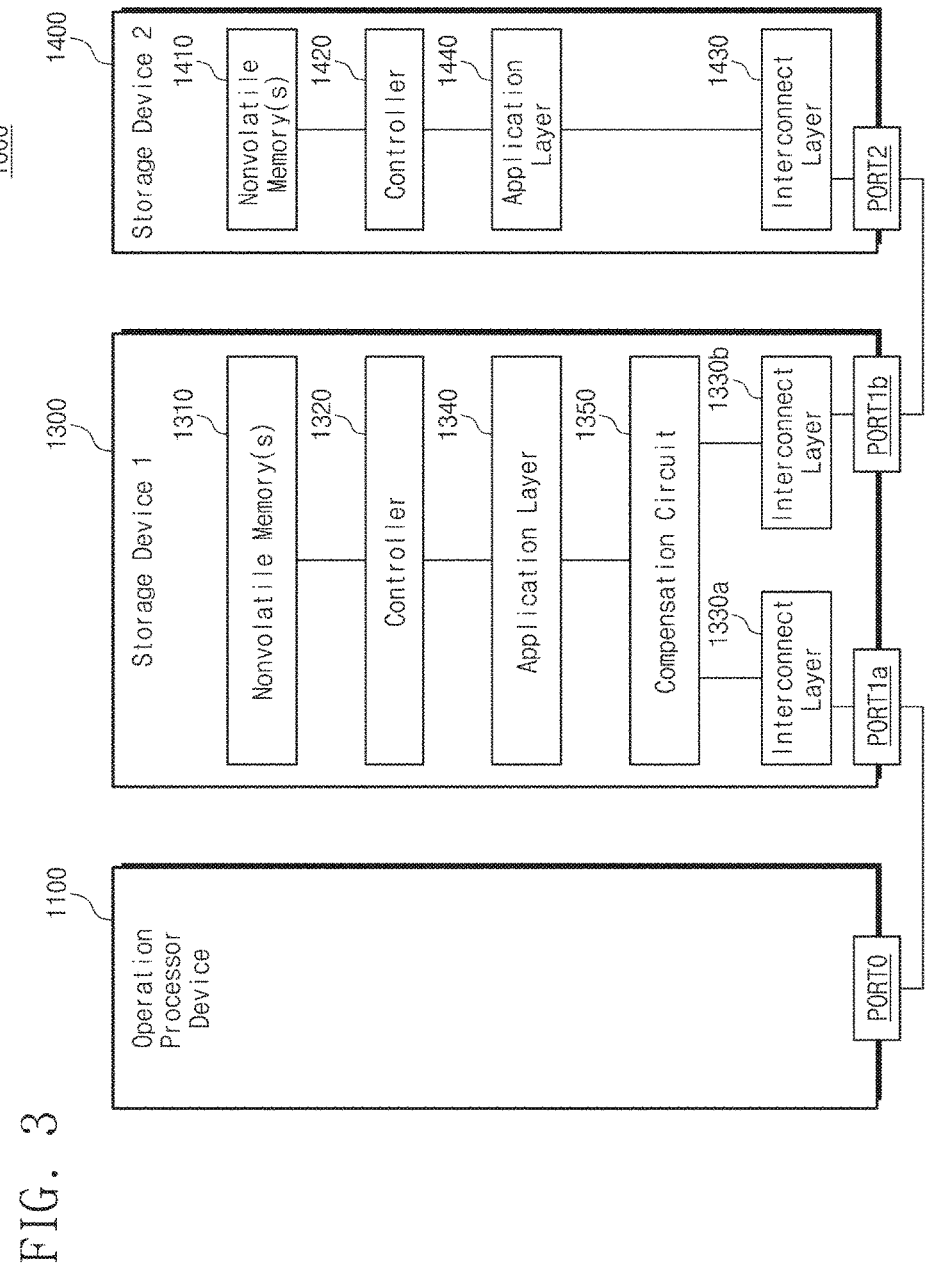
FIG. 3 is a block diagram illustrating example configurations of storage devices of FIG. 1.

FIG. 3 is a block diagram illustrating example configurations of the storage devices of FIG. 1.

In some example embodiments, the first storage device 1300 may further include interconnect layers 1330a and 1330b, an application layer 1340, and a compensation circuit 1350. The interconnect layer 1330a may transmit and receive data/signal/packet through the port PORT1a, and the interconnect layer 1330b may transmit and receive data/signal/packet through the port PORT1b. The interconnect layers 1330a and 1330b may include a physical layer and a link layer which are defined in an interface protocol employed by the first storage device 1300. For example, the interconnect layers 1330a and 1330b may include various hardware components such as a transmission/reception circuit, a modulation/demodulation circuit, a converter circuit, and/or the like.

The application layer 1340 may understand and process various commands and/or packets of the interface protocol employed by the first storage device 1300. The application layer 1340 may provide a communication service on the first storage device 1300 by processing the interface protocol for the controller 1320. For example, the application layer 1340 may include various hardware circuits to process the interface protocol. Additionally or alternatively, the application layer 1340 may be implemented with an instruction set of a program code that may be executed by a processor core.

In some example embodiments, the second storage device 1400 may further include an interconnect layer 1430 and an application layer 1440. The interconnect layer 1430 may transmit and receive data/signal/packet through the port PORT2. The application layer 1440 may understand and process various commands/packets of the interface protocol employed by the second storage device 1400. The interconnect layer 1430 and the application layer 1440 may be configured similarly to the interconnect layer 1330a and the application layer 1340 respectively.

FIG. 3 illustrates that the interconnect layers 1330a, 1330b, and 1430 and the application layers 1340 and 1440 are independent components. However, this configuration is to facilitate better understanding, and is not to limit the inventive concepts. In some example embodiments, the interconnect layers 1330a and 1330b and/or the application layer 1340 may be included in the controller 1320, and the interconnect layer 1430 and/or the application layer 1440 may be included in the controller 1420.

For example, when the operation processor device 1100 intends to communicate with the first storage device 1300 (e.g., intends to store data in the first storage device 1300 or reads data from the first storage device 1300), the operation processor device 1100 may provide a command and/or data to the application layer 1340 through the ports PORT0 and PORT1a and the interconnect layer 1330a. The controller 1320 may store data in the nonvolatile memories 1310 or read data from the nonvolatile memories 1310, based on information processed by the application layer 1340. The read data may be provided to the operation processor device 1100 through the interconnect layer 1330a and the ports PORT1a and PORT0.

Meanwhile, the operation processor device 1100 may intend to communicate with the second storage device 1400. However, since the operation processor device 1100 may not be directly connected with the second storage device 1400, the operation processor device 1100 may provide a command and/or data configured for the second storage device 1400 to the first storage device 1300 through the ports PORT0 and PORT1a and the interconnect layer 1330a. The first storage device 1300 may transfer the provided command and/or data to the second storage device 1400 through the interconnect layer 1330b and the ports PORT1b and PORT2.

The second storage device 1400 may receive command and/or data from the first storage device 1300 through the interconnect layer 1430. The controller 1420 may store data in the nonvolatile memories 1410 or read data from the nonvolatile memories 1410, based on information processed by the application layer 1440. The read data may be provided to the first storage device 1300 through the interconnect layer 1430 and the ports PORT2 and PORT1b.

The first storage device 1300 may receive data from the second storage device 1400 through the interconnect layer 1330b. The first storage device 1300 may transfer the received data to the operation processor device 1100 through the interconnect layer 1330a and the ports PORT1a and PORT0. Accordingly, the first storage device 1300 may process the command and/or data received from the operation processor device 1100 by itself, or may transfer the command and/or data to the second storage device 1400.

In some cases, the operation processor device 1100, the first storage device 1300, and the second storage device 1400 may have different characteristics. This is because the operation processor device 1100, the first storage device 1300, and the second storage device 1400 may be designed based on different purposes, different performances, and different requirements. For example, the operation processor device 1100 may process a packet having a first characteristic. On the other hand, the first storage device 1300 may process a packet having a second characteristic, and the second storage device 1400 may process a packet having a third characteristic.

For example, the "characteristic" may be associated with unit size of a data portion included in a packet. For example, the operation processor device 1100 may process a packet including a data portion of 4 kilobytes (kB). On the other hand, the controller 1320 of the first storage device 1300 may process a packet including a data portion of 16 kB, and the controller 1420 of the second storage device 1400 may process a packet including a data portion of 2 kB.

However, the above example is provided to facilitate better understanding, and is not to limit the inventive concepts. The "characteristic" may include various other operation conditions, requirements, and/or the like, and various examples will be described with reference to FIGS. 4A to 9. Further, unit size of a data portion processed by each of, or at least one of the operation processor device 1100, the first storage device 1300, and the second storage device 1400 may be variously changed or modified depending on a purpose, performance, and/or a requirement or desirability.

The compensation circuit 1350 may compensate different characteristics between the operation processor device 1100, the first storage device 1300, and the second storage device 1400. For example, the compensation circuit 1350 may compensate difference among a first characteristic of a packet which is processed by the operation processor device 1100, a second characteristic of a packet which is processed by the first storage device 1300, and a third characteristic of a packet which is processed by the second storage device 1400.

In the inventive concepts, the "compensation" may mean operations of properly processing and managing packets such that packets having different characteristics are processed in multiple electronic devices. Various examples of the compensation operations will be described with reference to FIGS. 4A to 9.

For example, the first storage device 1300 may receive a packet of the third characteristic from the second storage device 1400, for the operation processor device 1100. Further, in the first storage device 1300, the controller 1320 (and/or the application layer 1340) may prepare a packet of the second characteristic, for the operation processor device 1100. On the basis of the operation of the compensation circuit 1350, at least one of the packet of the second characteristic or the packet of the third characteristic may be provided to the operation processor device 1100 according to the first characteristic. To this end, the compensation circuit 1350 may compensate at least one of the second characteristic or the third characteristic.

For example, the first storage device 1300 may receive a packet of the first characteristic from the operation processor device 1100. When the received packet is configured for the first storage device 1300, the first storage device 1300 may process the received packet by the controller 1320 (and/or the application layer 1340) of the first storage device 1300 according to the second characteristic. On the other hand, when the received packet is configured for the second storage device 1400, the first storage device 1300 may transfer the received packet to the second storage device 1400 according to the third characteristic. To this end, the compensation circuit 1350 may compensate the first characteristic. The second storage device 1400 may process the packet, which is received from the operation processor device 1100 through the first storage device 1300, by the controller 1420 (and/or the application layer 1440).

When the compensation circuit 1350 is not provided, the operation processor device 1100 may require both a communication channel (e.g., a transmission/reception line, a physical layer, and/or the like) for communicating with the first storage device 1300 and a communication channel for communicating with the second storage device 1400. This is because a characteristic of a packet processed by the first storage device 1300 may be different from a characteristic of a packet processed by the second storage device 1400. Thus, design/manufacturing costs and configuration complexity of the operation processor device may increase.

However, when the compensation circuit 1350 is provided, the compensation circuit 1350 may compensate different characteristics of packets processed by the operation processor device 1100, the first storage device 1300, and the second storage device 1400. Thus, the operation processor device 1100 may require only a communication channel for communicating with the first storage device 1300, and it may be possible to implement only one communication channel. As a result, design/manufacturing costs and configuration complexity of the operation processor device 1100 may decrease.

The compensation circuit 1350 may include various hardware circuits to perform compensation operations. Additionally or alternatively, the compensation circuit 1350 may be implemented with an instruction set of a program code that may be executed by a processor core, to perform compensation operations. Further, FIG. 3 illustrates that the compensation circuit 1350 is an independent component, but in some example embodiments, the compensation circuit 1350 may be included in the interconnect layers 1330a and 1330b and/or the application layer 1340.

FIGS. 4A to 4D are conceptual diagrams for describing example configuration and operation of the first storage device of FIG. 3 for managing transmission of data write request packets. In some example embodiments, the compensation circuit 1350 of the first storage device 1300 may include a characteristic manager 1351a, a buffer 1353a, and a transmission scheduler 1355a.

Figure 4A:
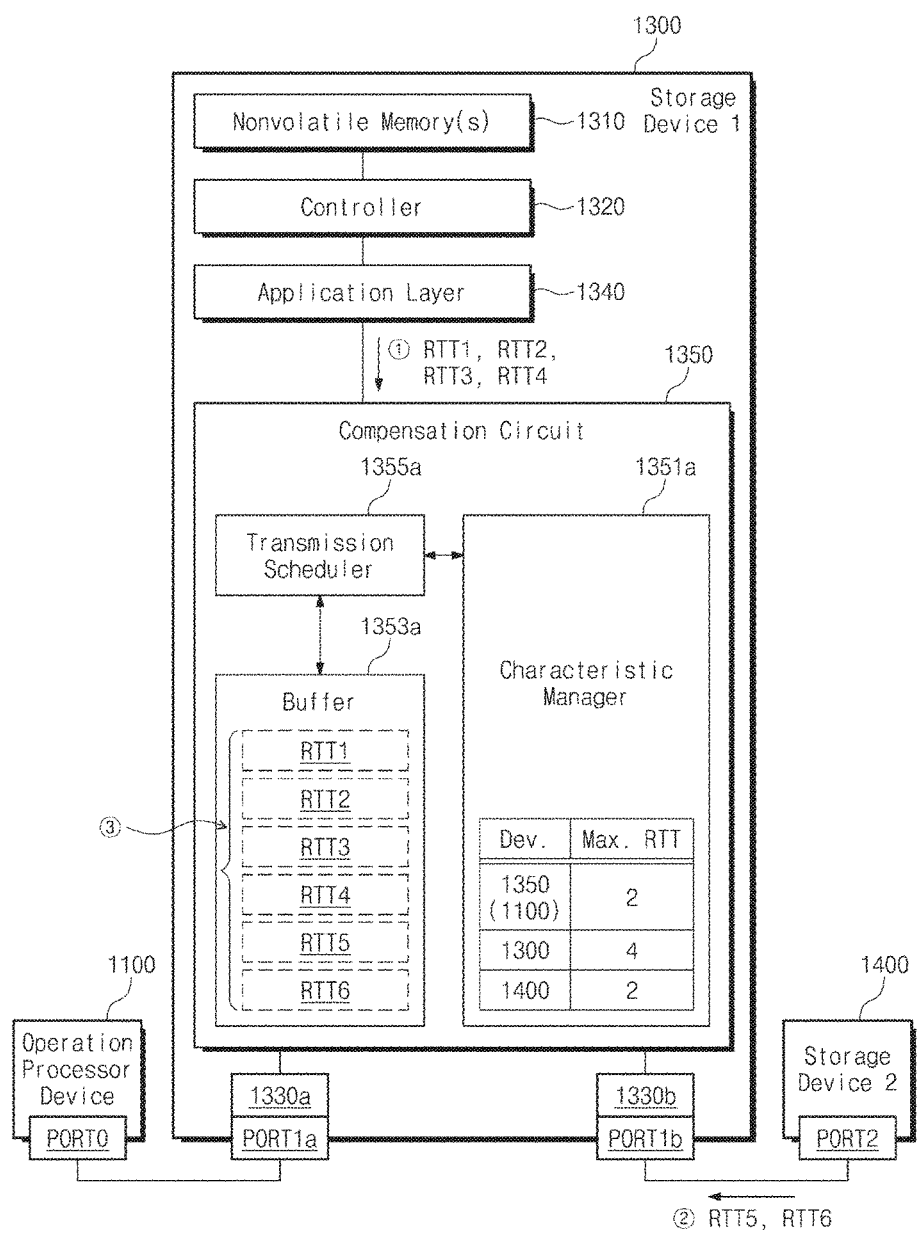
FIGS. 4A to 4D are conceptual diagrams for describing example configuration and operation of a first storage device of FIG. 3 for managing transmission of data write request packets.

Referring to FIG. 4A, the characteristic manager 1351a may manage the first characteristic associated with the operation processor device 1100, the second characteristic associated with the first storage device 1300, and the third characteristic associated with the second storage device 1400. For example, the characteristic manager 1351a may collect information associated with the first characteristic, the second characteristic, and the third characteristic, during a booting operation of the first storage device 1300 and/or the storage system 1000. For example, the characteristic manager 1351a may collect information associated with the first characteristic, the second characteristic, and the third characteristic in real time while the first storage device 1300 is operating.

For example, a communication protocol for exchanging characteristic information between the operation processor device 1100, the first storage device 1300, and the second storage device 1400 may be newly defined to collect information associated with the first characteristic, the second characteristic, and the third characteristic. For example, the characteristic manager 1351a may include a memory device or may use a memory area of the first storage device 1300 (e.g., an internal buffer, the nonvolatile memories 1310, and/or the like) to store the collected information.

In an example of FIGS. 4A to 4D, the first characteristic may be associated with the number of data write request packets which are supported, or maximally supported by the operation processor device 1100. The second characteristic may be associated with the number of data write request packets which are generated by the first storage device 1300, and the third characteristic may be associated with the number of data write request packets which are generated by the second storage device 1400.

The data write request packet may be understood as a ready-to-transfer (RTT) packet. When the operation processor device 1100 transmits a write command or request to the storage devices 1300 and 1400, the storage devices 1300 and 1400 may transmit a data write request packet to the operation processor device 1100 to inform the operation processor device 1100 of available resource information such as the remaining capacity of the internal buffer and/or the like. The operation processor device 1100 may transmit write data to the storage devices 1300 and 1400 suitably for the storage devices 1300 and 1400, with reference to the data write request packet.

For example, to facilitate better understanding and not to limit the inventive concepts, the operation processor device 1100 may support up to two (2) data write request packets. Further, the first storage device 1300 may generate up to four (4) data write request packets, and the second storage device 1400 may generate up to two (2) data write request packets.

Since the operation processor device 1100 may support up to two data write request packets, the compensation circuit 1350 may allow up to two data write request packets to be exchanged with the operation processor device 1100. To this end, the characteristic manager 1351a may set the number, or maximum number, of the data write request packets to 2, in connection with the operation processor device 1100 and/or the compensation circuit 1350. Such a setting may be based on a request of the operation processor device 1100 or characteristic information exchanged with the operation processor device 1100.

The application layer 1340 may provide four data write request packets RTT1, RTT2, RTT3, and RTT4 to the compensation circuit 1350, based on information generated by an operation of the controller 1320 (operation ①). The application layer 1440 of the second storage device 1400 may provide two data write request packets RTT5 and RTT6 to the first storage device 1300, based on information generated by an operation of the controller 1420 (operation ②).

The buffer 1353a may buffer packets of the first storage device 1300 and packets received from the second storage device 1400. For example, the buffer 1353a may buffer six (6) data write request packets RTT1, RTT2, RTT3, RTT4, RTT5, and RTT6 (operation ③). However, in an example of FIGS. 4A to 4C, the operation processor device 1100 may support up to two data write request packets. Thus, the operation processor device 1100 may not process the buffered six data write request packets RTT1, RTT2, RTT3, RTT4, RTT5, and RTT6 simultaneously, or concurrently.

Thus, the transmission scheduler 1355a may manage (e.g., schedule) transmission of the data write request packets buffered in the buffer 1353a to the operation processor device 1100, such that the number of data write request packets provided to the operation processor device 1100 among the data write request packets buffered in the buffer 1353a is not greater than the number of data write request packets supported by the operation processor device 1100. For example, the transmission scheduler 1355a may allow the buffer 1353a to output up to two data write request packets among the data write request packets RTT1, RTT2, RTT3, RTT4, RTT5, and RTT6, with reference to information managed by the characteristic manager 1351a.

Figure 4B:
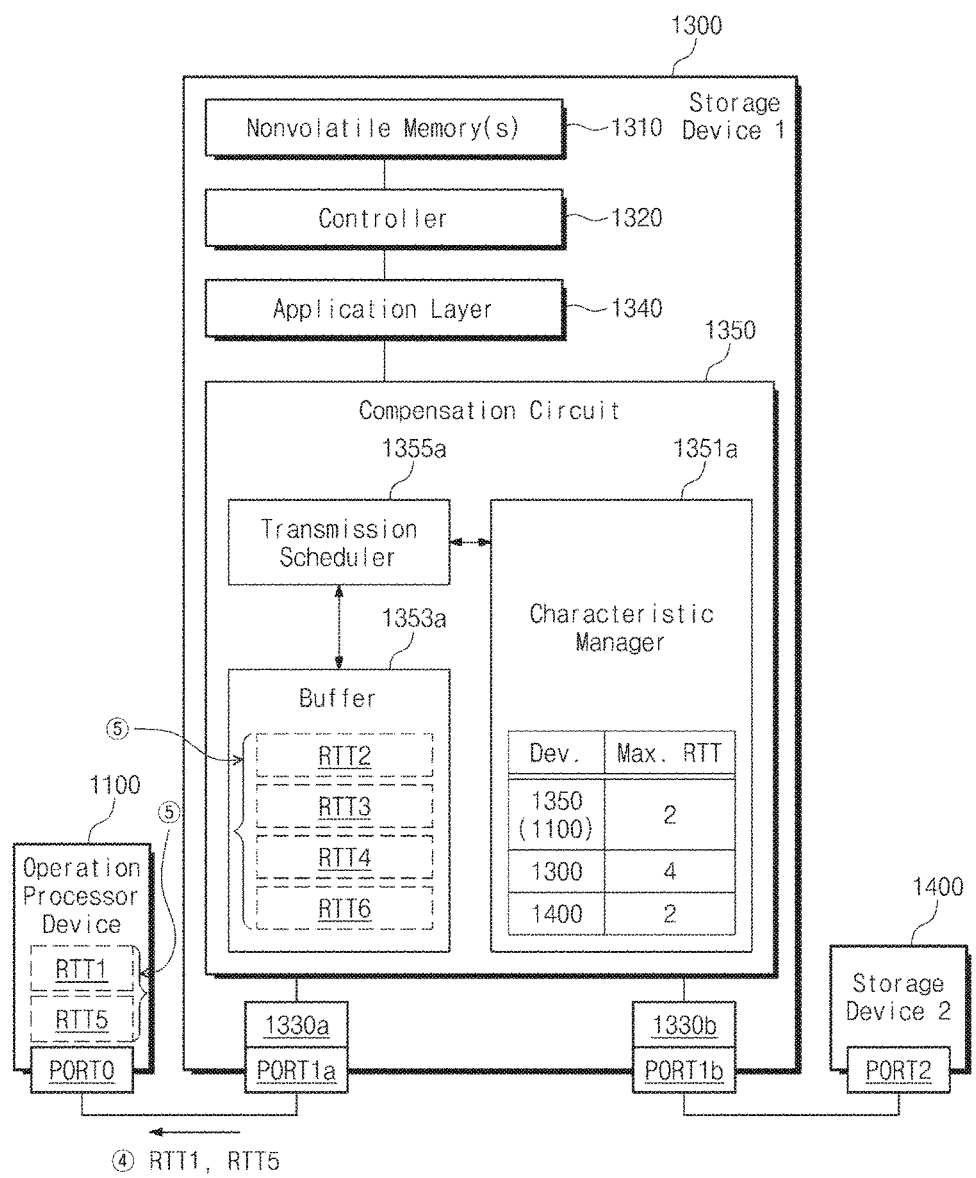

Referring to FIG. 4B, for example, the first storage device 1300 may provide two data write request packets RTT1 and RTT5 to the operation processor device 1100 (operation ④). Thus, the operation processor device 1100 may process the data write request packets RTT1 and RTT5, and the buffer 1353a may buffer the remaining data write request packets RTT2, RTT3, RTT4, and RTT6 (operation ⑤). That is, the buffer 1353a may continuously buffer remaining data write request packets other than output data write request packets.

FIG. 4B illustrates that the data write request packets RTT1 and RTT5 are provided to the operation processor device 1100. However, in another example, the first storage device 1300 may output the data write request packets RTT2 and RTT6 or the data write request packets RTT1 and RTT2, instead of the data write request packets RTT11 and RTT5. Outputting and buffering the data write request packets may be variously changed or modified.

For example, the transmission scheduler 1355a may allow a data write request packet having high priority, a data write request packet that requires urgent transmission, or a data write request packet which allows performance improvement to be output prior to the other packets. That is, the transmission scheduler 1355a may manage the number and the sequence of data write request packets which are provided to the operation processor device 1100.

Figure 4C:
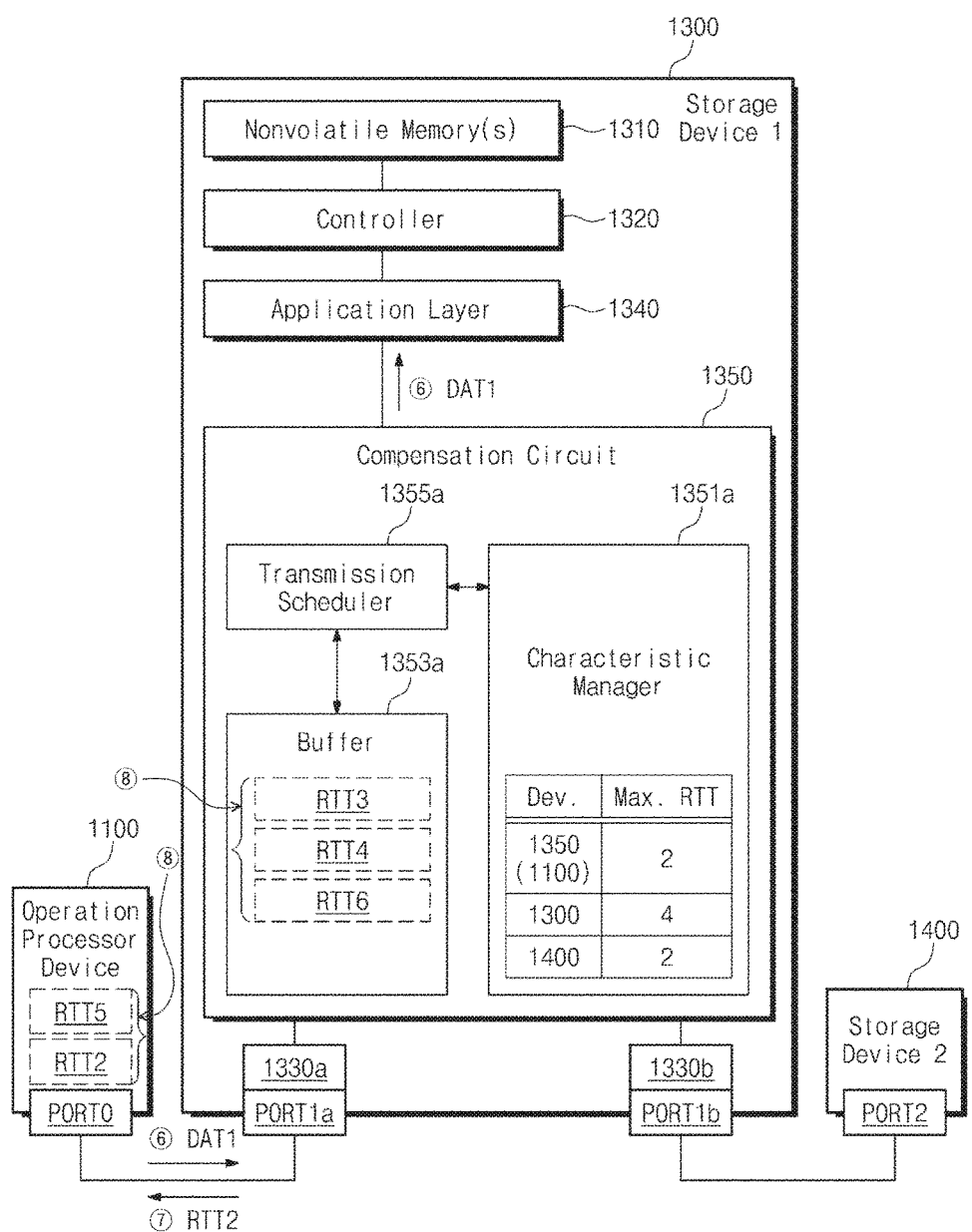

Referring to FIG. 4C, the operation processor device 1100 may output a write data packet DAT1 corresponding to the data write request packet RTT1. The first storage device 1300 may process the write data packet DAT1 by the controller 1320 and/or the application layer 1340 to store write data corresponding to the write data packet DAT1 in the nonvolatile memories 1310 (operation ⑥).

As the operation processor device 1100 completes processing of the data write request packet RTT1, the operation processor device 1100 may be capable of additionally processing one data write request packet. Thus, in response to the write data packet DAT1, the transmission scheduler 1355a may allow the data write request packet RTT2 buffered in the buffer 1353a to be output and then to be provided to the operation processor device 1100 (operation ⑦). Accordingly, the operation processor device 1100, may process the additionally received data write request packet RTT2 in addition to the data write request packet RTT5 which is not processed yet. The buffer 1353a may buffer the remaining data write request packets RTT3, RTT4, and RTT6 (operation ⑧).

Accordingly, the compensation circuit 1350 of the first storage device 1300 may perform a compensation operation, such that the sum of the number of data write request packets provided from the first storage device 1300 to the operation processor device 1100 and the number of data write request packets provided from the second storage device 1400 to the operation processor device 1100 through the first storage device 1300 is not greater than the number of data write request packets supported, or maximally supported by the operation processor device 1100. When the sum of the number of data write request packets of the first storage device 1300 and the number of data write request packets received from the second storage device 1400 is greater than the number of data write request packets supported, or maximally supported by the operation processor device 1100, the first storage device 1300 may buffer remaining data write request packets other than data write request packets provided to the operation processor device 1100. When the number of data write request packets which are currently being processed in the operation processor device 1100 is smaller than the number of data write request packets supported, or maximally supported by the operation processor device 1100, the first storage device 1300 may additionally provide the buffered data write request packet to the operation processor device 1100. When the buffer 1353a outputs all the data write request packets, a compensation operation may not be performed.

The number of data write request packets described with reference to FIGS. 4A to 4C is provided to facilitate better understanding, and is not to limit the inventive concepts. The number of data write request packets may be variously changed or modified depending on a purpose, performance, and a requirement, or desirability, of at least one of the operation processor device 1100, the first storage device 1300, and the second storage device 1400.

For another example, when the operation processor device 1100 supports up to three data write request packets, the transmission scheduler 1355a may control the buffer 1353a such that up to three (3) data write request packets are output and remaining data write request packets are buffered. When the operation processor device 1100 is currently processing less than three data write request packets, the transmission scheduler 1355a may control the buffer 1353a such that at least one of buffered data write request packets is additionally output.

Figure 4D:
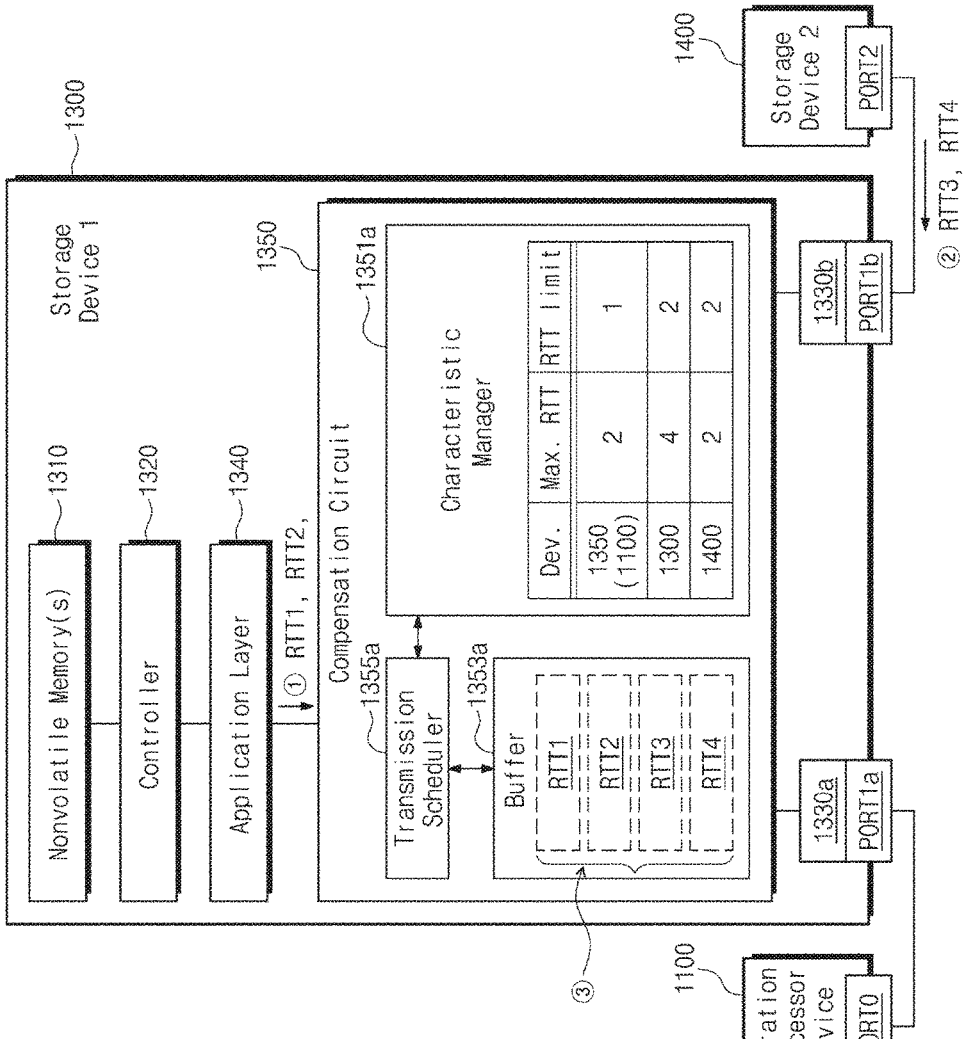

Referring to FIG. 4D, in some non-limiting example embodiments, the characteristic manager 1351a may further manage the limited number of data write request packets in addition to the allowable number of data write request packets. The allowable number of data write request packets may be associated with capacity which is physically allowed depending on hardware design and/or performance, and the limited number of data write request packets may be associated with an upper limit of the number of data write request packets which are allowed to be actually generated. Unlike the allowable number, the limited number may be arbitrarily set or selected depending on, for example, an operation policy, a user request, and/or the like. For example, the limited number may be set or selected according to a request of the operation processor device 1100 and/or a determination of the compensation circuit 1350.

The limited number of data write request packets actually generated by the first storage device 1300 may be less than or equal to the maximum number of data write request packets that may be generated by the first storage device 1300. The limited number of data write request packets actually generated by the second storage device 1400 may be less than or equal to the maximum number of data write request packets that may be generated by the second storage device 1400. The limited number of data write request packets actually communicated with the operation processor device 1100 may be less than or equal to the maximum number of data write request packets that may be communicated with the operation processor device 1100.

For example, referring to FIG. 4D, although the first storage device 1300 may generate up to four data write request packets, the characteristic manager 1351a may manage the limited number such that the compensation circuit 1350 receives up to two data write request packets from the application layer 1340. Meanwhile, for example, when the second storage device 1400 may generate up to two data write request packets, the characteristic manager 1351a may manage the limited number such that the compensation circuit 1350 receives up to two data write request packets from the second storage device 1400.

For example, although the operation processor device 1100 may support up to two data write request packets, the characteristic manager 1351a may manage the limited number such that the compensation circuit 1350 exchanges one (1) data write request packet with the operation processor device 1100. However, the above examples are provided to facilitate better understanding, and are not to limit the inventive concepts. The limited number of data write request packets and the maximum number of data write request packets may be variously changed or modified.

In regards to the above examples, the application layers 1340 may provide up to two data write request packets (e.g., RTT1 and RTT2) to the compensation circuit 1350 based on information generated by an operation of the controller 1320 (operation ①). The application layers 1440 of the second storage device 1400 may provide up to two data write request packets (e.g., RTT3 and RTT4) to the first storage device 1300 based on information generated by an operation of the controller 1420 (operation ②).

The buffer 1353a may buffer packets of the first storage device 1300 and packets received from the second storage device 1400. For example, the buffer 1353a may buffer four data write request packets RTT1, RTT2, RTT3, and RTT4 (operation ③). The transmission scheduler 1355a may allow the buffer 1353a to output up to one data write request packet among the data write request packets RTT1, RTT2, RTT3, and RTT4, with reference to information (e.g., the limited number) managed by the characteristic manager 1351a. A data write request packet which is output from the buffer 1353a may be transmitted to the operation processor device 1100, and the operation processor device 1100 may process up to one data write request packet.

Figure 5A:
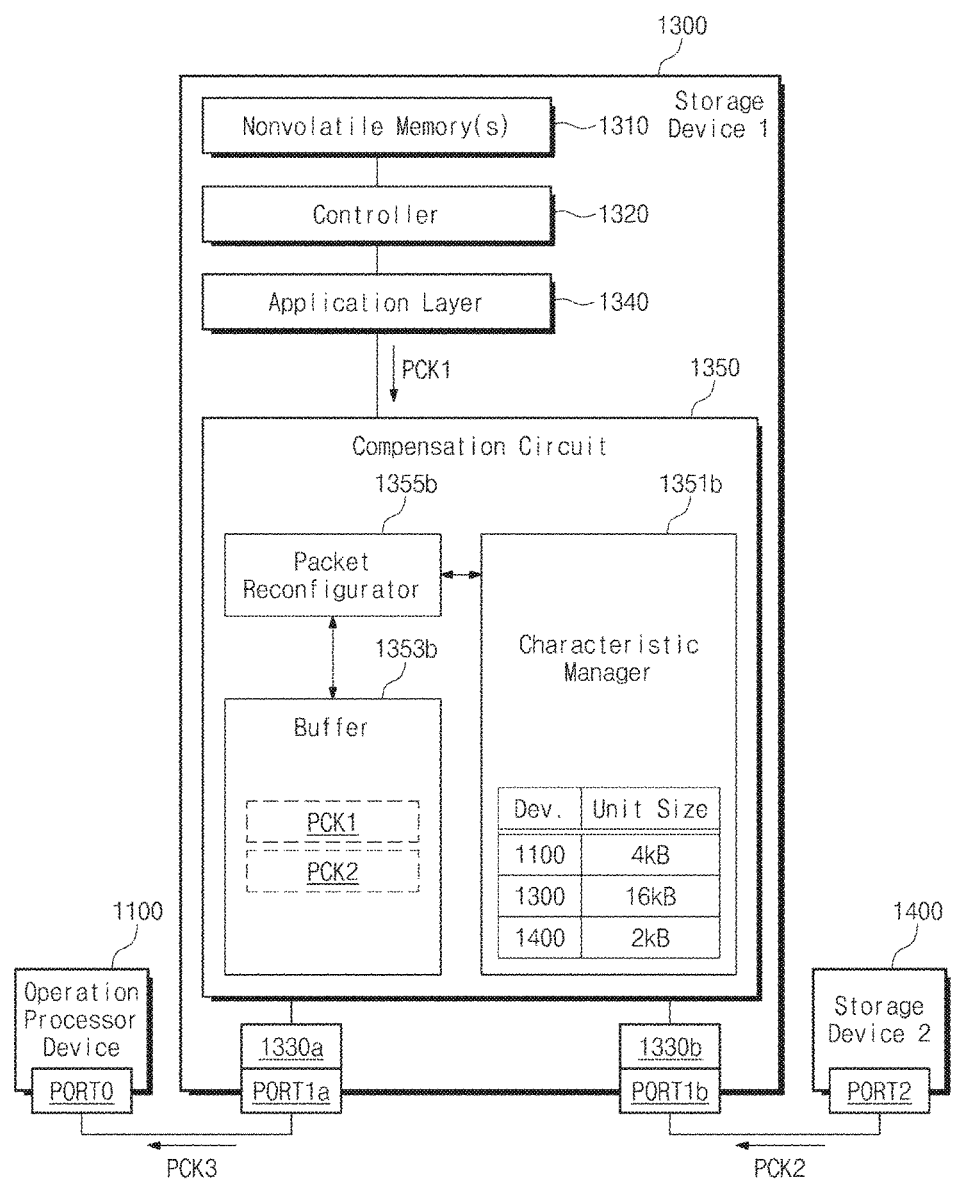
FIGS. 5A to 5C are conceptual diagrams for describing example configuration and operation of a first storage device of FIG. 3 for processing reconfiguration of a data portion of a packet.
Figure 5B:
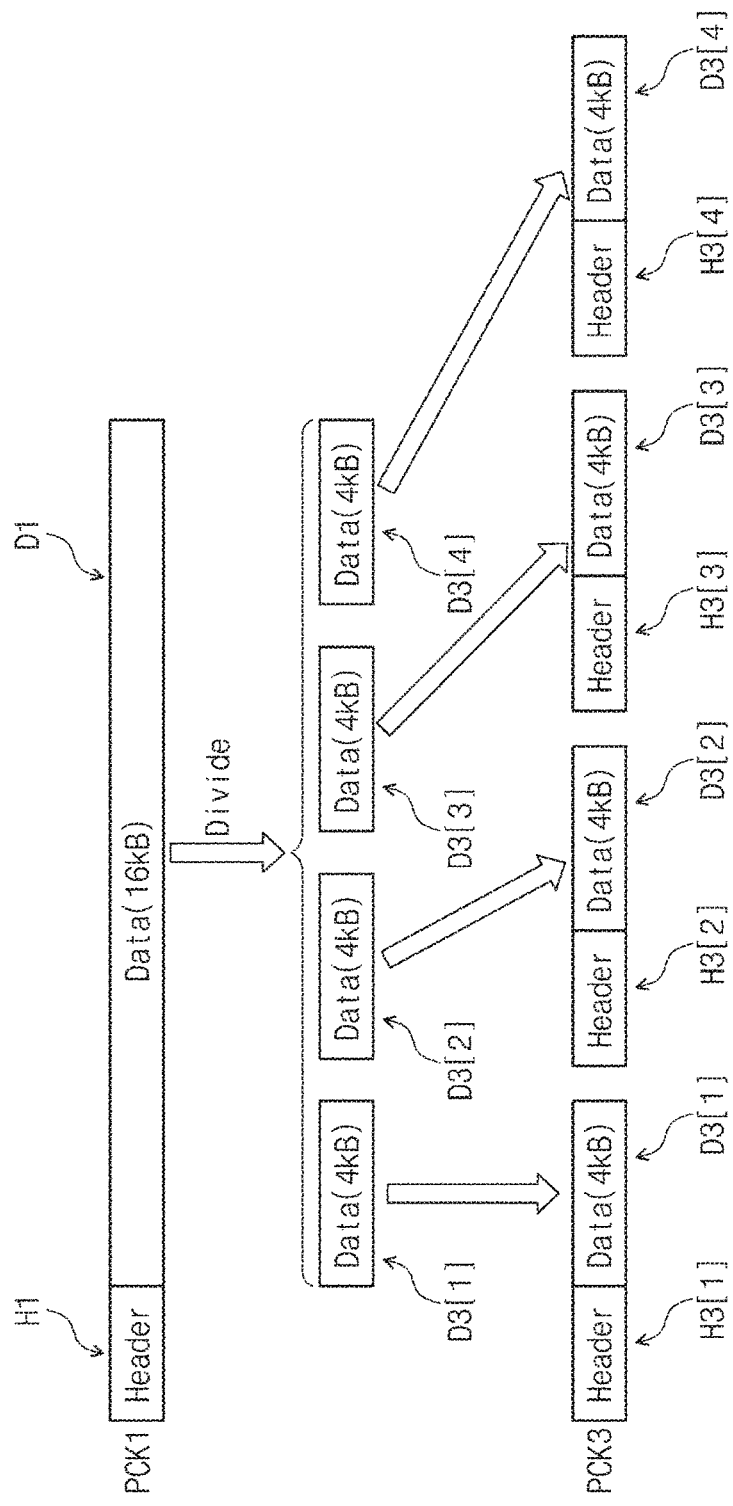
Figure 5C:
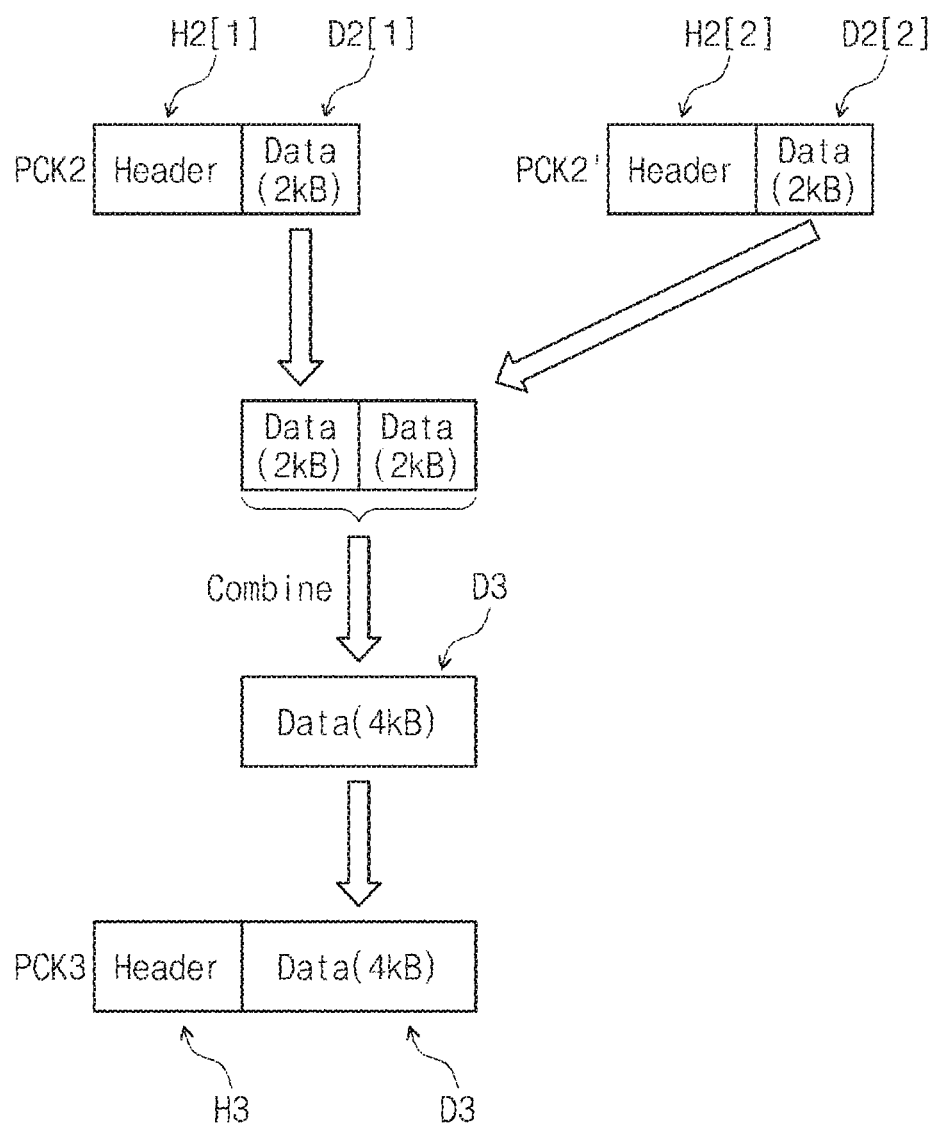

FIGS. 5A to 5C are conceptual diagrams for describing example configuration and operation of the first storage device of FIG. 3 for processing reconfiguration of a data portion of a packet. In some non-limiting example embodiments, the compensation circuit 1350 of the first storage device 1300 may include a characteristic manager 1351b, a buffer 1353b, and a packet reconfigurator 1355b.

Referring to FIG. 5A, the characteristic manager 1351b may manage the first characteristic associated with the operation processor device 1100, the second characteristic associated with the first storage device 1300, and the third characteristic associated with the second storage device 1400. The characteristic manager 1351b may be configured and may operate substantially the same as or similarly to the characteristic manager 1351a of FIG. 4A.

In an example of FIGS. 5A to 5C, the first characteristic may be associated with the unit size of a data portion which corresponds to one header portion in a packet processed by the operation processor device 1100. The second characteristic may be associated with the unit size of a data portion which corresponds to one header portion in a packet processed by the first storage device 1300, and the third characteristic may be associated with the unit size of a data portion which corresponds to a header portion in a packet processed by the second storage device 1400.

A packet may include a data portion which includes information to be transferred. The packet may include a header portion that describes a size, a destination, a content, and/or like, of the data portion. One header portion may correspond to one data portion.

For example to facilitate better understanding but not to limit the inventive concepts, the operation processor device 1100 may process a packet which includes a data portion of 4 kB. Further, the first storage device 1300 may process a packet which includes a data portion of 16 kB, and the second storage device 1400 may process a packet which includes a data portion of 2 kB.

The application layer 1340 may provide a packet PCK1 to the compensation circuit 1350, based on information generated by an operation of the controller 1320. The application layer 1440 of the second storage device 1400 may provide a packet PCK2 to the first storage device 1300, based on information generated by an operation of the controller 1420.

The buffer 1353*b* may buffer a packet of the first storage device 1300 and a packet received from the second storage device 1400. For example, the buffer 1353*b* may buffer the packets PCK1 and PCK2. The packet PCK1 may include the data portion of 16 kB and a header portion corresponding to the data portion of 16 kB, and the packet PCK2 may include the data portion of 2 kB and a header portion corresponding to the data portion of 2 kB. However, since the operation processor device 1100 may process a packet which includes the data portion of 4 kB, the operation processor device 1100 may not process the packets PCK1 and PCK2.

Accordingly, the packet reconfigurator 1355*b* may reconfigure a packet that may not be processed by the operation processor device 1100, and thus may generate a packet that may be processed by the operation processor device 1100. The packet reconfigurator 1355*b* may operate with reference to information managed by the characteristic manager 1351*b*.

For example, the packet reconfigurator 1355*b* may reconfigure a data portion of at least one of the packets PCK1 and/or PCK2 and a header portion corresponding to the data portion, such that a data portion corresponding to one header portion in at least one of the packets PCK1 and/or PCK2 has unit size that may be processed by the operation processor device 1100. According to an operation of the packet reconfigurator 1355*b*, the operation processor device 1100 may receive a packet PCK3 including a data portion having unit size that may be processed by the operation processor device 1100 and a header portion corresponding to the data portion.

For example, the unit size (e.g., 16 kB) of a data portion included in the packet PCK1 may be greater than the unit size (e.g., 4 kB) for the packet PCK3. Referring to FIG. 5B, the packet PCK1 may include a data portion D1 and a header portion H1 corresponding to the data portion D1. The packet reconfigurator 1355*b* may divide the data portion D1 into a plurality of new data portions D3[1], D3[2], D3[3], and D3[4]. At least one of the new data portions D3[1], D3[2], D3[3], and D3[4] may have unit size for the packet PCK3.

The packet reconfigurator 1355*b* may generate a plurality of new header portions H3[1], H3[2], H3[3], and H3[4] which respectively correspond to the new data portions D3[1], D3[2], D3[3], and D3[4]. The packet reconfigurator 1355*b* may combine one of the new data portions D3[1], D3[2], D3[3], and D3[4] with a corresponding one of the new header portions H3[1], H3[2], H3[3], and H3[4] to generate a reconfigured packet. Thus, the packet configurator 1355*b* may generate a plurality of reconfigured packets. The buffer 1353*b* may temporarily buffer intermediate results while the reconfigured packets are generated.

According to such a compensation operation, the packet PCK3 may be configured by reconfigured packets. At least one of the reconfigured packets may include a data portion having unit size that may be processed by the operation processor device 1100. The packet PCK3 may be provided to the operation processor device 1100 based on the reconfigured packets.

Referring to FIG. 5C, the packet PCK2 may include a data portion D2[1] and a header portion H2[1] corresponding to the data portion D2[1]. However, unit size (e.g., 2 kB) of the data portion included in the packet PCK2 may be smaller than unit size (e.g., 4 kB) for the packet PCK3. Thus, according to an operation of the packet reconfigurator 1355*b*, the buffer 1353*b* may buffer the packet PCK2 and one or more subsequent packets which follows the packet PCK2, until data portions of the packet PCK2 and the subsequent packets are accumulated as much as the unit size of a data portion for the packet PCK3.

For example, the first storage device 1300 may receive a packet PCK2' which follows the packet PCK2, from the second storage device 1400. The packet PCK2' may include a data portion D2[2] and a header portion H2[2] corresponding to the data portion D2[2]. Since the data portions D2[1] and D2[2] are accumulated as much as unit size of the data portion for the packet PCK3, the packet reconfigurator 1355*b* may combine the data portions D2[1] and D2[2] into one data portion D3. Further, the packet reconfigurator 1355*b* may generate a new header portion H3 corresponding to the data portion D3.

According to such a compensation operation, the packet PCK3 may be reconfigured to include the data portion D3 and the new header portion H3. The data portion D3 may have unit size for the packet PCK3. Thus, the packet PCK3 may be provided to the operation processor device 1100 and thus may be processed in the operation processor device 1100. The buffer 1353*b* may temporarily buffer intermediate results while the reconfigured packet PCK3 is generated.

The unit sizes described with reference to FIGS. 5A to 5C are provided to facilitate better understanding, and are not to limit the inventive concepts. The unit size of the data portion may be variously changed or modified depending on a purpose, performance, and/or a requirement or desirability of at least one of the operation processor device 1100, the first storage device 1300, and the second storage device 1400. In some cases, when unit size of a data portion associated with the first storage device 1300 or the second storage device 1400 is the same as the unit size of a data portion associated with the operation processor device 1100, a compensation operation may not be performed.

Conversely, a data portion of a packet from the operation processor device 1100 may have a unit size that may not be processed in the first storage device 1300 or the second storage device 1400. In this case, the compensation circuit 1350 may reconfigure the packet received from the operation processor device 1100 for the first storage device 1300 or the second storage device 1400, according to an operation of the packet reconfigurator 1355*b*.

Figure 6:
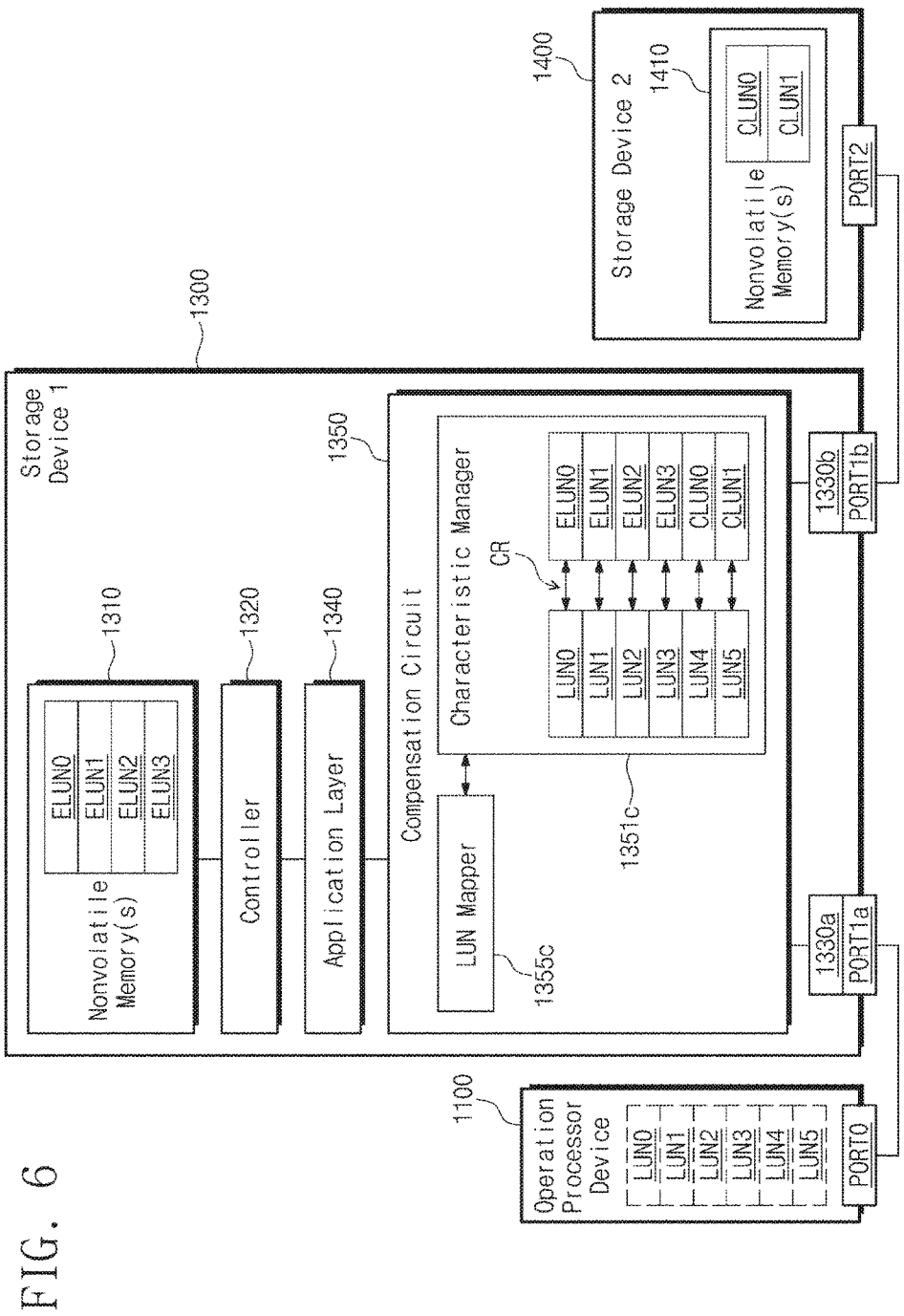
FIG. 6 is a conceptual diagram for describing example configuration and operation of a first storage device of FIG. 3 for managing mapping of identifiers of memory areas included in storage devices of FIG. 3.

FIG. 6 is a conceptual diagram for describing example configuration and operation of the first storage device of FIG. 3 for managing a mapping of identifiers of memory areas included in storage devices of FIG. 3. In some non-limiting example embodiments, the compensation circuit 1350 of the first storage device 1300 may include a characteristic manager 1351*c* and a logical unit number (LUN) mapper 1355*c*.

The nonvolatile memories 1310 of the first storage device 1300 and the nonvolatile memories 1410 of the second storage device 1400 may include a plurality of memory areas which is managed based on different identifiers (e.g., LUNs). For example, memory areas included in the nonvolatile memories 1310 may be distinguished and managed based on identifiers ELUN0, ELUN1, ELUN2, and ELUN3, and memory areas included in the nonvolatile memories 1410 may be distinguished and managed based on identifiers CLUN0 and CLUN1. Memory areas may be distinguished according to various factors such as a policy of the storage system 1000, a request of the operation processor device 1100, and/or the like.

In some cases, the operation processor device 1100 may distinguish memory areas included in the first storage device 1300 and the second storage device 1400 based on identifiers LUN0, LUN1, LUN2, LUN3, LUN4, and LUN5. That is, the identifiers managed by the operation processor device 1100 may be different from the identifiers managed by the first storage device 1300 and the second storage device 1400. Thus, the compensation circuit 1350 may compensate a difference between the identifiers managed by the operation processor device 1100 and the identifiers managed by the first storage device 1300 and the second storage device 1400.

The characteristic manager 1351c may manage the first characteristic associated with the operation processor device 1100, the second characteristic associated with the first storage device 1300, and the third characteristic associated with the second storage device 1400. The characteristic manager 1351c may be configured and may operate substantially the same as or similarly to the characteristic manager 1351a of FIG. 4A.

In an example of FIG. 6, the first characteristic may be associated with the identifiers LUN0, LUN1, LUN2, LUN3, LUN4, and LUN5 which are managed by the operation processor device 1100. The second characteristic may be associated with the identifiers ELUN0, ELUN1, ELUN2, and ELUN3 which are managed by the first storage device 1300, and the third characteristic may be associated with the identifiers CLUN0 and CLUN1 which are managed by the second storage device 1400.

The characteristic manager 1351c may further manage a correspondence relationship CR between identifiers. The LUN mapper 1355c may map the identifiers LUN0, LUN1, LUN2, LUN3, LUN4, and LUN5 with the identifiers ELUN0, ELUN1, ELUN2, ELUN3, CLUN0, and CLUN1 respectively, based on the correspondence relationship CR which is managed by the characteristic manager 1351c.

A packet communicated between the operation processor device 1100, the first storage device 1300, and the second storage device 1400 may include information of an identifier, e.g., in its header portion. The packet may be processed in connection with a memory area indicated by the identifier.

For example, when the first storage device 1300 receives a packet that indicates one of the identifiers LUN0, LUN1, LUN2, and LUN3 from the operation processor device 1100, the LUN mapper 1355c may map the identifier of the received packet to corresponding one among the identifiers ELUN0, ELUN1, ELUN2, and ELUN3, with reference to the correspondence relationship CR. According to such a compensation operation, the received packet may be processed in connection with a memory area having a mapped identifier in the nonvolatile memories 1310 of the first storage device 1300.

For example, when the first storage device 1300 receives a packet that indicates one of the identifiers LUN4 and LUN5 from the operation processor device 1100, the LUN mapper 1355c may map the identifier of the received packet to the corresponding one among the identifiers CLUN0 and CLUN1, with reference to the correspondence relationship CR. According to such a compensation operation, the received packet may be transferred to the second storage device 1400. The transferred packet may be processed in connection with a memory area having a mapped identifier in the nonvolatile memories 1410.

Conversely, in some cases, the LUN mapper 1355c may map an identifier of a packet of the first storage device 1300 or a packet received from the second storage device 1400 to an identifier managed by the operation processor device 1100, with reference to the correspondence relationship CR. A packet having the mapped identifier may be provided to the operation processor device 1100. On the basis of the mapped identifier, the operation processor device 1100 may determine which memory area the packet is processed in connection with.

The identifiers described with reference to FIG. 6 are provided to facilitate better understanding, and are not to limit the inventive concepts. The number of the identifiers (i.e., the number of memory areas) and the correspondence relationship CR may be variously changed or modified depending on a policy and a configuration.

Figure 7A:
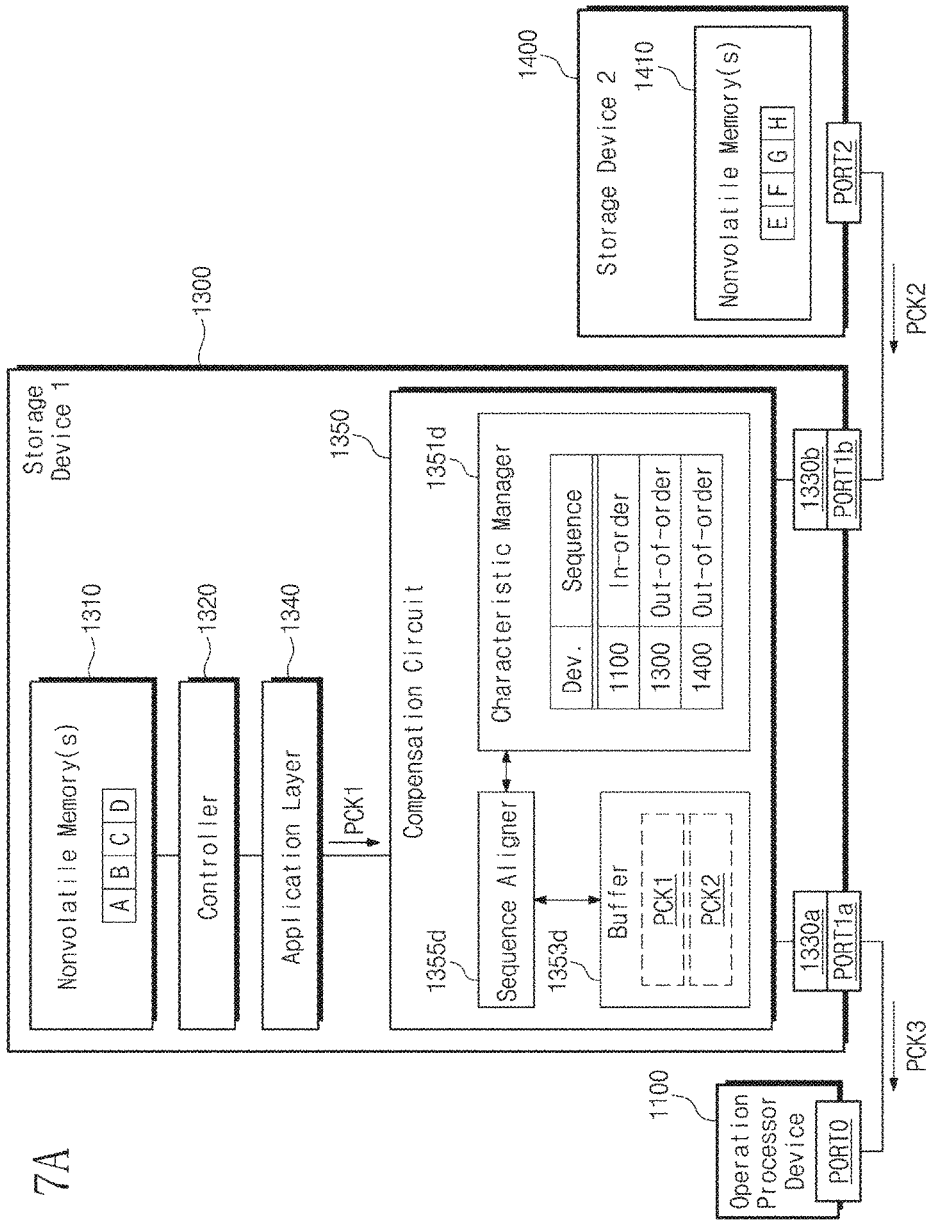
FIGS. 7A and 7B are conceptual diagrams for describing example configuration and operation of a first storage device of FIG. 3 for processing ordering of data sequence of packets.
Figure 7B:
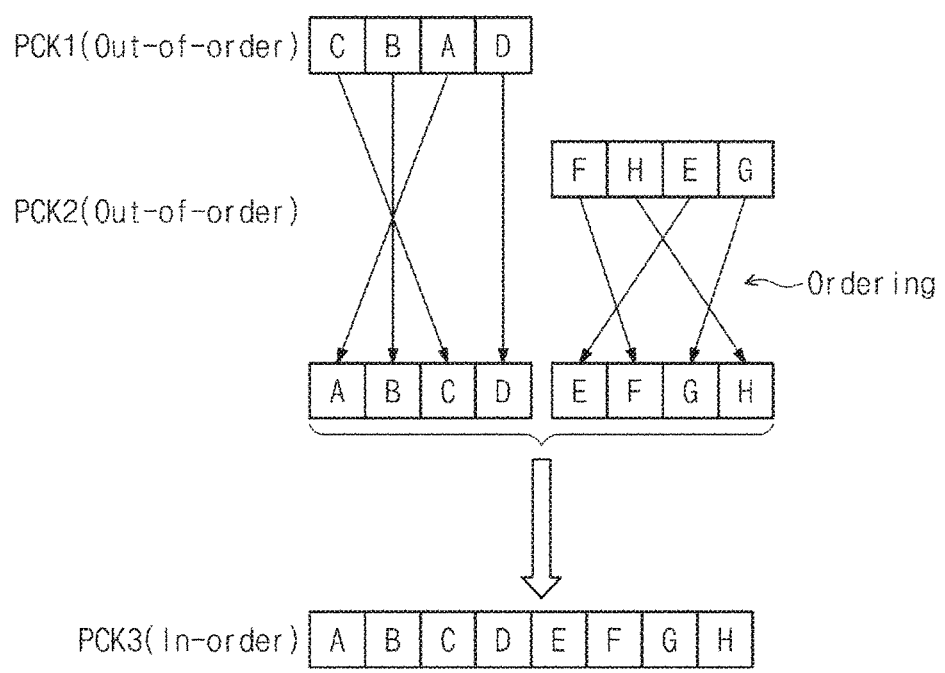

FIGS. 7A and 7B are conceptual diagrams for describing example configuration and operation of the first storage device of FIG. 3 for processing ordering of a data sequence of packets. In some non-limiting example embodiments, the compensation circuit 1350 of the first storage device 1300 may include a characteristic manager 1351d, a buffer 1353d, and a sequence aligner 1355d.

Referring to FIG. 7A, the characteristic manager 1351d may manage the first characteristic associated with the operation processor device 1100, the second characteristic associated with the first storage device 1300, and the third characteristic associated with the second storage device 1400. The characteristic manager 1351d may be configured and may operate substantially the same as or similarly to the characteristic manager 1351a of FIG. 4A.

In an example of FIGS. 7A and 7B, the first characteristic may indicate that the operation processor device 1100 may process packets arranged in in-order sequence data. The second characteristic may indicate that data sequence of packets output from the first storage device 1300 is out-of-order, and the third characteristic may indicate that data sequence of packets output from the second storage device 1400 is out-of-order.

For example, the first storage device 1300 may intend to output data A, B, C, and D stored in the nonvolatile memories 1310 to the operation processor device 1100. For example, the data A, B, C, and D may have a sequence of "A-B-C-D". The application layer 1340 may provide a packet PCK1 to the compensation circuit 1350 based on the data A, B, C, and D read through the controller 1320. The buffer 1353d may buffer the packet PCK1.

For example, the second storage device 1400 may intend to transfer data E, F, G, and H stored in the nonvolatile memories 1410 to the operation processor device 1100. For example, the data E, F, G, and H may have sequence of "E-F-G-H". The application layer 1440 may provide a packet PCK2 to the first storage device 1300 based on the data E, F, G, and H read through the controller 1420. The buffer 1353d may buffer the packet PCK2.

However, in some cases, data associated with the packets PCK1 and PCK2 may have out-of-order sequence. Referring to FIG. 7B together, for example, data associated with the packet PCK1 may have sequence of "C-B-A-D", and data associated with the packet PCK2 may have sequence of "F-H-E-G". In some cases, the storage devices 1300 and 1400 may generate the packets PCK1 and PCK2 according to an out-of-order sequence which is different from the originally arranged in-order sequence, considering various factors such as performance, efficiency, and/or the like, of data transmission.

Meanwhile, in some cases, the operation processor device 1100 may not process data of out-of-order sequence, e.g., because of a limitation on performance and/or design. In this case, the operation processor device 1100 may not process the packets PCK1 and PCK2 arranged in out-of-order sequence.

Thus, the sequence aligner 1355*d* may align an out-of-order sequence of data associated with the packets PCK1 and PCK2 to an in-order sequence, with reference to information managed by the characteristic manager 1351*d*. For example, the sequence aligner 1355*d* may align data associated with the packet PCK1 to sequence of "A-B-C-D", with reference to header portion(s) of the packet PCK1. For example, the sequence aligner 1355*d* may align data associated with the packet PCK2 to sequence of "E-F-G-H", with reference to header portion(s) of the packet PCK2. The buffer 1353*d* may temporarily buffer intermediate results while data sequence is aligned.

According to such a compensation operation, the sequence aligner 1355*d* may generate the packet PCK3. Data associated with the packet PCK3 may have in-order sequence. Thus, the packet PCK3 may be provided to the operation processor device 1100, and then may be processed in the operation processor device 1100.

The data sequence, the in-order sequence, and the out-of-order sequence described with reference to FIGS. 7A and 7B are provided to facilitate better understanding, and are not to limit the inventive concepts. In some other examples, the first storage device 1300 or the second storage device 1400 may output packets according to in-order sequence, and the operation processor device 1100 may process packets of out-of-order sequence. Conversely in such examples, the compensation circuit 1350 may align a data sequence of packets received from the operation processor device 1100 for the first storage device 1300 or the second storage device 1400 according to an operation of the sequence aligner 1355*d*. In some cases, when data sequence is not conflicted between the operation processor device 1100, the first storage device 1300, and the second storage device, the compensation operation may not be performed.

Figure 8:
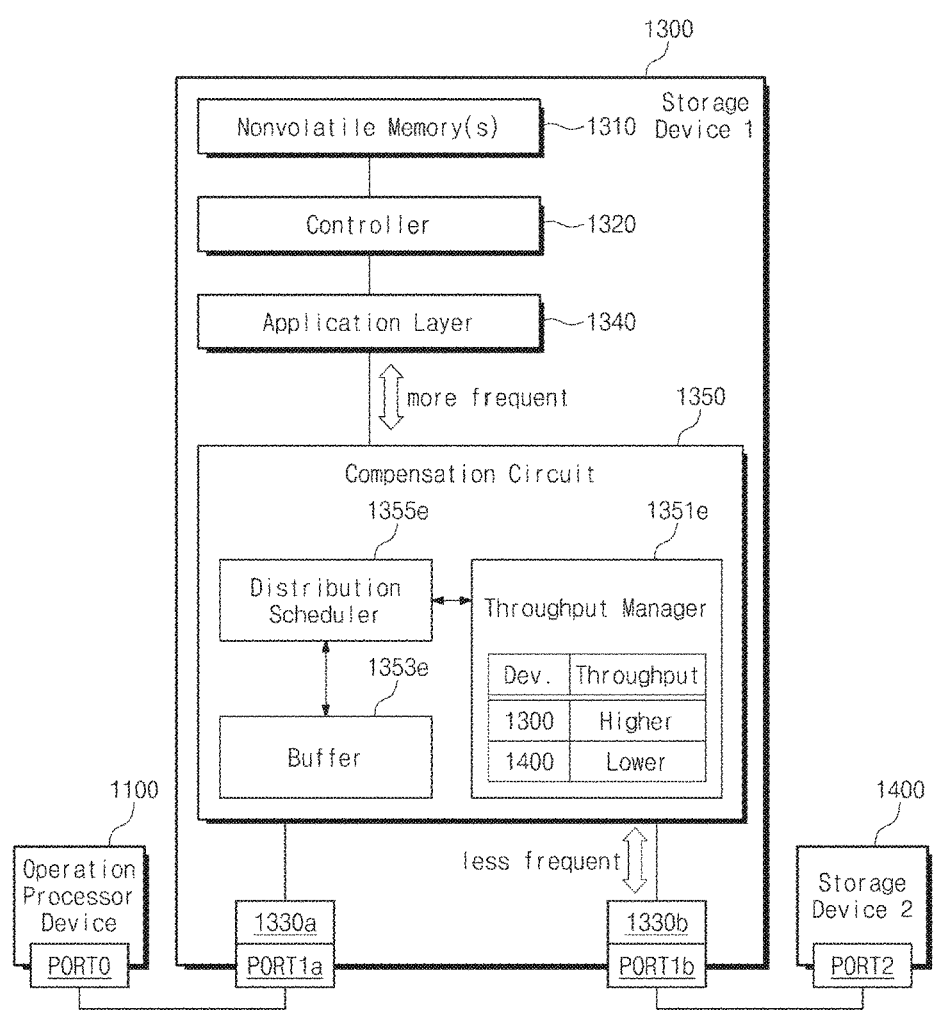
FIG. 8 is a conceptual diagram for describing example configuration and operation of a first storage device of FIG. 3 for managing packet distribution according to throughput of each of, or at least one of storage devices of FIG. 3.

FIG. 8 is a conceptual diagram for describing an example configuration and operation of the first storage device of FIG. 3 for managing packet distribution according to a throughput of at least one of the storage devices of FIG. 3. In some example embodiments, the compensation circuit 1350 of the first storage device 1300 may include a throughput manager 1351*e*, a buffer 1353*e*, and a distribution scheduler 1355*e*.

In some cases, the first storage device 1300 and the second storage device 1400 may operate concurrently or simultaneously. For example, the operation processor device 1100 may intend to store data in both the first storage device 1300 and the second storage device 1400.

Meanwhile, a throughput of the first storage device 1300 may be different from a throughput of the second storage device 1400. For example, the first storage device 1300 may be requested to store a relatively large amount of data, and the second storage device 1400 may be requested to store a relatively small amount of data. For example, processing bandwidth of the first storage device 1300 may be higher than processing bandwidth of the second storage device 1400. In these examples, referring to FIG. 8, the throughput of the first storage device 1300 may be higher than the throughput of the second storage device 1400.

The throughput manager 1351*e* may manage information associated with throughput of at least one of the first storage device 1300 and the second storage device 1400. For example, the throughput manager 1351*e* may collect throughput information based on device information of at least one of the first storage device 1300 and the second storage device 1400. For example, the throughput manager 1351*e* may collect throughput information by monitoring an amount of packets transferred through a communication line. However, these examples are to facilitate better understanding, and not to limit the inventive concepts.

The buffer 1353*e* may buffer packets received from the operation processor device 1100. The buffered packets may be processed in the first storage device 1300 or may be transferred to the second storage device 1400.

Meanwhile, when throughput of the first storage device 1300 is higher than throughput of the second storage device 1400, it may be efficient, or desirable, to process packets in the first storage device 1300 more frequently than transferring packets to the second storage device 1400. Thus, the distribution scheduler 1355*e* may manage (e.g., schedule) distribution of packets with reference to information managed by the throughput manager 1351*e*, such that packets buffered in the buffer 1353*e* are processed by the controller 1320 (and/or the application layer 1340) more frequently than being transferred to the second storage device 1400.

In some cases, unlike the illustration described in FIG. 8, throughput of the second storage device 1400 may be higher than throughput of the first storage device 1300. In this case, according to an operation of the distribution scheduler 1355*e*, packets buffered in the buffer 1353*e* may be transferred to the second storage device 1400 more frequently than being processed in the first storage device 1300. Performance of the storage system 1000 may be improved according to such a compensation operation.

Conversely, the operation processor device 1100 may intend to read data from both the first storage device 1300 and the second storage device 1400. In this case, according to an operation of the distribution scheduler 1355*e*, packets of the first storage device 1300 may be provided to the operation processor device 1100 more frequently than packets from the second storage device 1400 being provided to the operation processor device 1100, or packets from the second storage device 1400 may be provided to the operation processor device 1100 more frequently than packets of the first storage device 1300 being provided to the operation processor device 1100.

Figure 9:
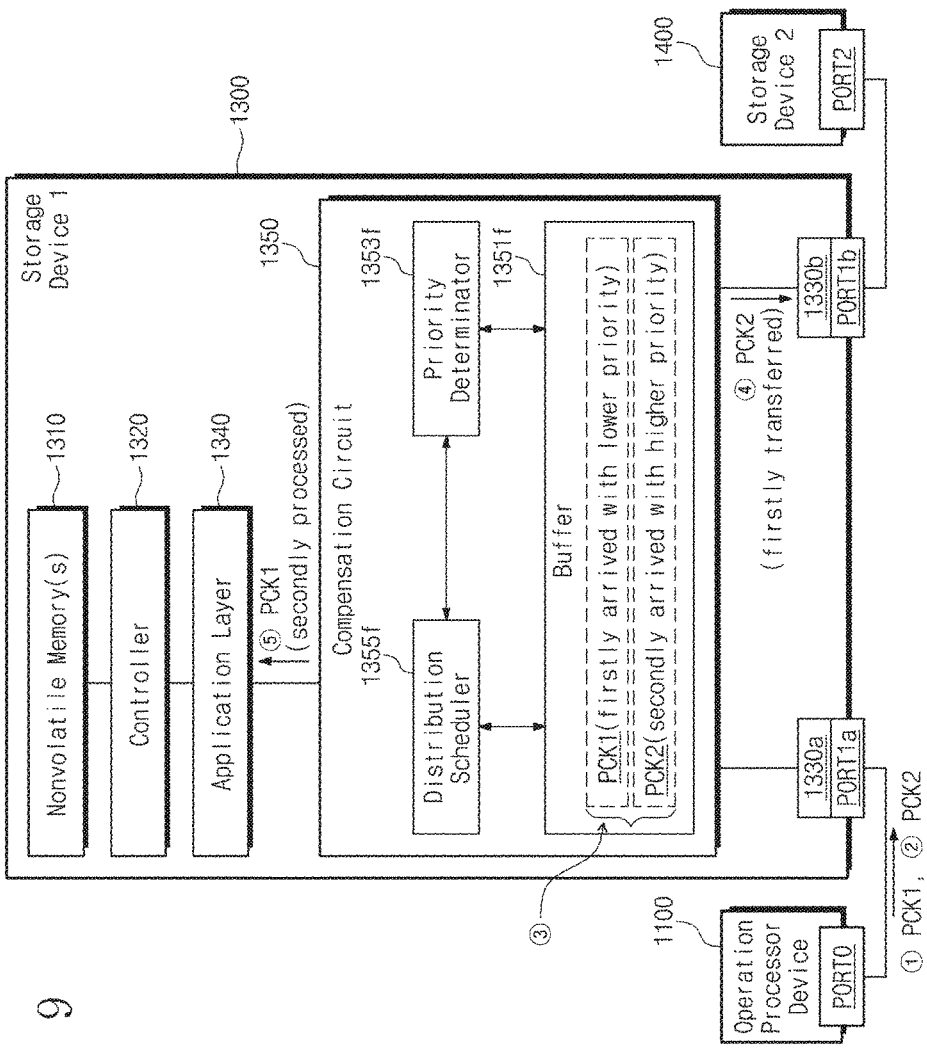
FIG. 9 is a conceptual diagram for describing example configuration and operation of a first storage device of FIG. 3 for managing packet distribution according to priority associated with processing a packet.

FIG. 9 is a conceptual diagram for describing a non-limiting example configuration and operation of the first storage device of FIG. 3 for managing packet distribution according to priority associated with processing a packet. In some example embodiments, the compensation circuit 1350 of the first storage device 1300 may include a buffer 1351*f*, a priority determinator 1353*f*, and a distribution scheduler 1355*f*.

The operation processor device 1100 may transmit a packet PCK1 for the first storage device 1300 to the first storage device 1300 (operation ①). The operation processor device 1100 may transmit a packet PCK2 for the second storage device 1400 to the first storage device 1300 (operation ②). For example, the packet PCK1 may be transmitted before the packet PCK2.

The buffer 1351*f* may buffer packets received from the operation processor device 1100. For example, the buffer 1351*f* may buffer the first received packet PCK1, and then may further buffer the second received packet PCK2 (operation ③).

Meanwhile, in some cases, priority may be given to at least one of, for example, each of the packets PCK1 and PCK2. For example, higher priority may be given to a packet requested to be urgently processed, a packet associated with metadata, a packet associated with a system management (e.g., performance, life), and/or the like. For example, information associated with priority may be included in a header portion of the packet.

The priority determinator 1353*f* may determine the priority of a packet buffered in the buffer 1351*f*, with reference to a header portion of the packet buffered in the buffer 1351*f*. The distribution scheduler 1355*f* may manage (e.g., schedule) distribution sequence of the packets, based on a determination result of the priority determinator 1353*f*. The distribution scheduler 1355*f* may distribute a packet having higher priority earlier, regardless of received sequence of packets.

For example, lower priority may be given to the packet PCK1, and higher priority may be given to the packet PCK2. In this example, even though the packet PCK1 is received before the packet PCK2, the distribution scheduler 1355*f* may control the buffer 1351*f* such that the packet PCK2 is distributed earlier than the packet PCK1. Thus, the packet PCK2 having higher priority may be transferred to the second storage device 1400 first, and then the packet PCK1 having lower priority may be processed by the controller 1320 (and/or the application layer 1340).

In some cases, unlike as illustrated and described in FIG. 9, priority of the packet PCK1 may be higher than priority of the packet PCK2. In this case, according to an operation of the distribution scheduler 1355*f*, the packet PCK1 may be processed in the first storage device 1300 first, and then the packet PCK2 may be transferred to the second storage device 1400. According to such a compensation operation, quality of service (QoS) of the storage system 1000 may be improved.

Conversely, the buffer 1351*f* may buffer a packet of the first storage device 1300 and a packet received from the second storage device 1400, and the first storage device 1300 may intend to provide the buffered packets to the operation processor device 1100. In this case, according to an operation of the distribution scheduler 1355*f*, the first storage device 1300 may provide the operation processor device 1100 with a packet having higher priority, among the packet of the first storage device 1300 and the packet received from the second storage device 1400, earlier.

The various compensation operations have been described with reference to FIGS. 4A to 9. However, the compensation circuit 1350 may further perform other kinds of compensation operations to compensate different characteristics of the operation processor device 1100, the first storage device 1300, and the second storage device 1400. FIGS. 4A to 9 are not to limit the inventive concepts.

In some cases, according to an operation of the compensation circuit 1350, a packet may be exchanged between the first storage device 1300 and the second storage device 1400. In some cases, the controller 1320 and/or the application layer 1340 may be involved in packet processing to exchange a packet between the first storage device 1300 and the second storage device 1400.

Figure 10:
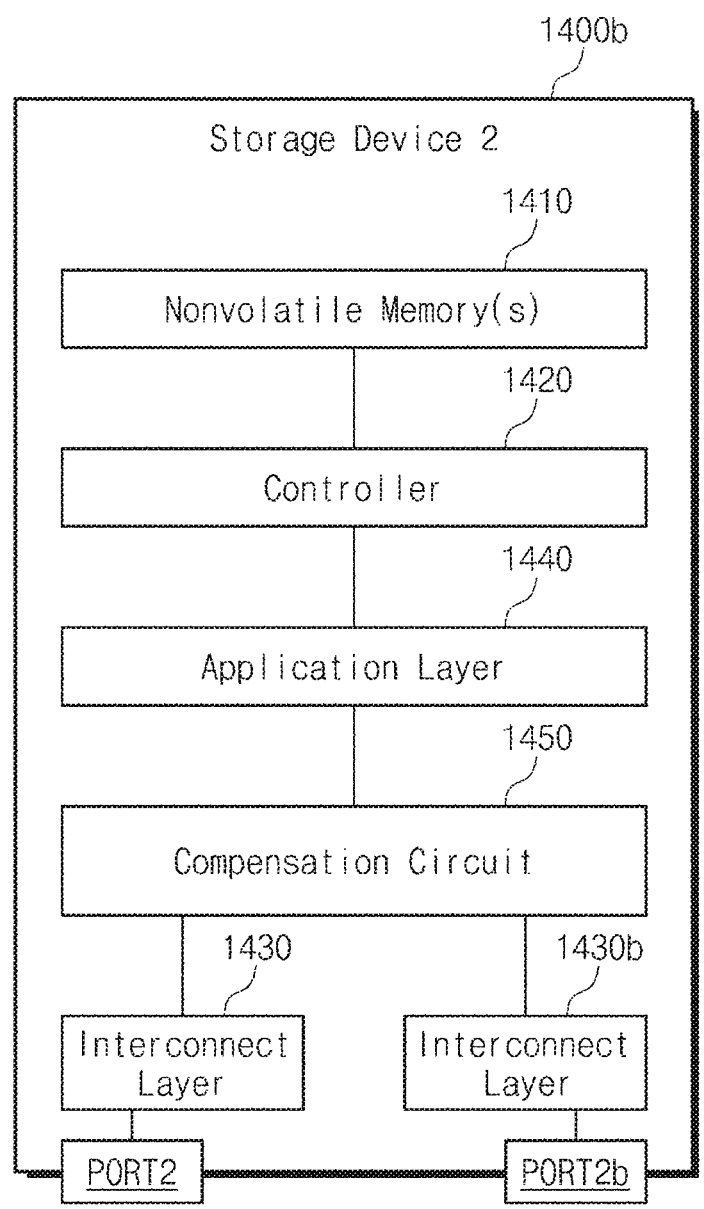
FIG. 10 is a block diagram illustrating an example configuration of a second storage device of FIG. 3.

FIG. 10 is a block diagram illustrating an example configuration of the second storage device of FIG. 3.

The storage system 1000 described with reference to FIGS. 1 to 9 may include two storage devices 1300 and 1400 serially connected to each other. However, in some example embodiments, the storage system 1000 may include three or more storage devices serially connected to each other (refer to FIG. 11). In such example embodiments, the second storage device 1400 of FIG. 3 may include a second storage device 1400*b* of FIG. 10.

The second storage device 1400*b* may include an interconnect layer 1430*b* and a compensation circuit 1450 in addition to the nonvolatile memories 1410, the controller 1420, the interconnect layer 1430, and the application layer 1440. The interconnect layer 1430*b* may transmit and receive data/signal/packet through a port PORT2*b*, similarly to the interconnect layer 1330*b* of FIG. 3. The port PORT2*b* may be directly connected to another storage device which is not directly connected to the operation processor device 1100 and the first storage device 1300.

The compensation circuit 1450 may perform various compensation operations similarly to the compensation circuit 1350 of FIG. 3. The compensation circuit 1450 may compensate different characteristics of the first storage device 1300 connected through the port PORT2, another storage device connected through the port PORT2*b*, and the second storage device 1400. To this end, the compensation circuit 1450 may perform the compensation operations described with reference to FIGS. 4A to 9 and other compensation operations.

Figure 11:
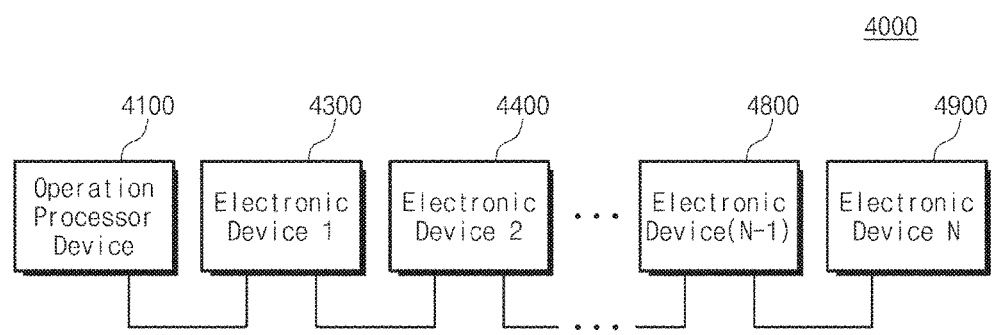
FIG. 11 is a block diagram illustrating an electronic system that includes electronic devices serially connected according to some example embodiments.
Figure 12A:
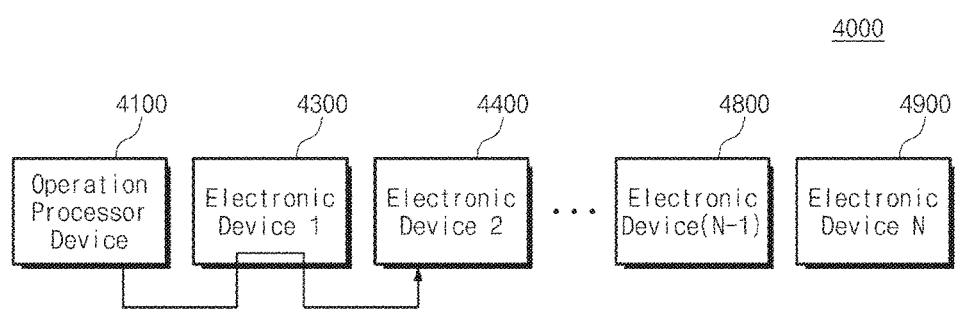
FIGS. 12A and 12B are conceptual diagrams for describing example processes of communicating with electronic devices which are not directly connected to an operation processor device in an electronic system of FIG. 11.
Figure 12B:
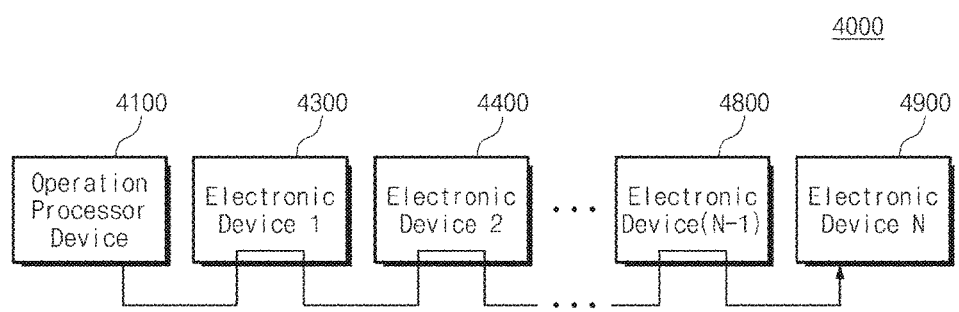

FIG. 11 is a block diagram illustrating an electronic system that includes electronic devices serially connected according to some example embodiments. FIGS. 12A and 12B are conceptual diagrams for describing example processes of communicating with electronic devices which are not directly connected to an operation processor device in an electronic system of FIG. 11.

Referring to FIG. 11, an electronic system 4000 may include an operation processor device 4100 and a plurality of electronic devices 4300, 4400, 4800, and 4900 serially connected to the operation processor device 4100. The operation processor device 4100 may correspond to one of the operation processor devices 1100, 2100, and 3100 described with reference to FIGS. 1 to 10.

The electronic system 4000 may be one of various types of electronic systems. The electronic system 4000 may correspond to the storage system 1000, the electronic device 2000, or the computing system 3000*a*, 3000*b*, or 3000*c* described with reference to FIGS. 1 to 10. For example, at least one of, or each of, the electronic devices 4300, 4400, 4800, and 4900 may correspond to one of the storage devices 1300, 1400, 1400*b*, 2300, 2400, 3300*a*, 3300*b*, 3300*c*, 3400*a*, 3400*b*, and 3400*c* described with reference to FIGS. 1 to 10.

However, the inventive concepts are not limited to the above examples. For example, at least one of the electronic devices 4300, 4400, 4800, and 4900 may include any type of electronic device such as a graphic processing device, a wired/wireless communication device, a display device, and/or the like. Use of the electronic system 4000 may be variously changed or modified depending on a type of at least one of the electronic devices 4300, 4400, 4800, and 4900.

The electronic devices 4300, 4400, 4800, and 4900 may be serially connected to each other through respective input/output ports thereof. The first electronic device 4300 may be at a tail end of the serial connection. The second electronic device 4400 may be connected to directly communicate with the first electronic device 4300. In this manner, the electronic devices 4300, 4400, 4800, and 4900 may be connected in the topology of a chain structure or a daisy-chain structure.

The operation processor device 4100 may be connected to directly communicate with the first electronic device 4300. However, the operation processor device 4100 may not be directly connected with other electronic devices 4400, 4800, and 4900. When the operation processor device 4100 intends to communicate with a target electronic device which is not directly connected to the operation processor device 4100, the operation processor device 4100 may communicate with the target electronic device through intermediate electronic device(s).

For example, referring to FIG. 12A, when the operation processor device 4100 intends to communicate with the second electronic device 4400, the operation processor device 4100 may communicate with the second electronic device 4400 through the first electronic device 4300. In this case, the first electronic device 4300 may perform various compensation operations to compensate different characteristics of the operation processor device 4100, the first electronic device 4300, and the second electronic device 4400.

For example, referring to FIG. 12B, an $N^{th}$ electronic device may be an interfacing electronic device, wherein the operation processor device 4100 intends to communicate with the $N^{th}$ electronic device. Accordingly, when the operation processor device 4100 intends to communicate with the $N^{th}$ electronic device 4900, the operation processor device 4100 may communicate with the $N^{th}$ electronic device 4900 through the first to $(N-1)^{th}$ electronic devices 4300 to 4800. In this case, at least one of the first to $(N-1)^{th}$ electronic devices 4300 to 4800 may be a designated electronic device configured to perform various compensation operations between the operation processor device 4100 and the $N^{th}$ electronic device 4900 to compensate different characteristics of components of the electronic system 4000.

To implement the electronic system 4000 of FIGS. 11, 12A and 12B, the operation processor device 4100 and the electronic devices 4300, 4400, 4800, and 4900 may employ at least one of the configurations, the operations, the processes, the methods, and/or the communications described with reference to FIGS. 1 to 10. The operation processor device 4100 and the electronic devices 4300, 4400, 4800, and 4900 may employ at least one of various interface protocols such as USB, SCSI, PCIe, NVMe, SATA, SAS, SD card, eMMC, UFS, and/or the like, to communicate with each other, but this example is not to limit the inventive concepts.

Figure 13:
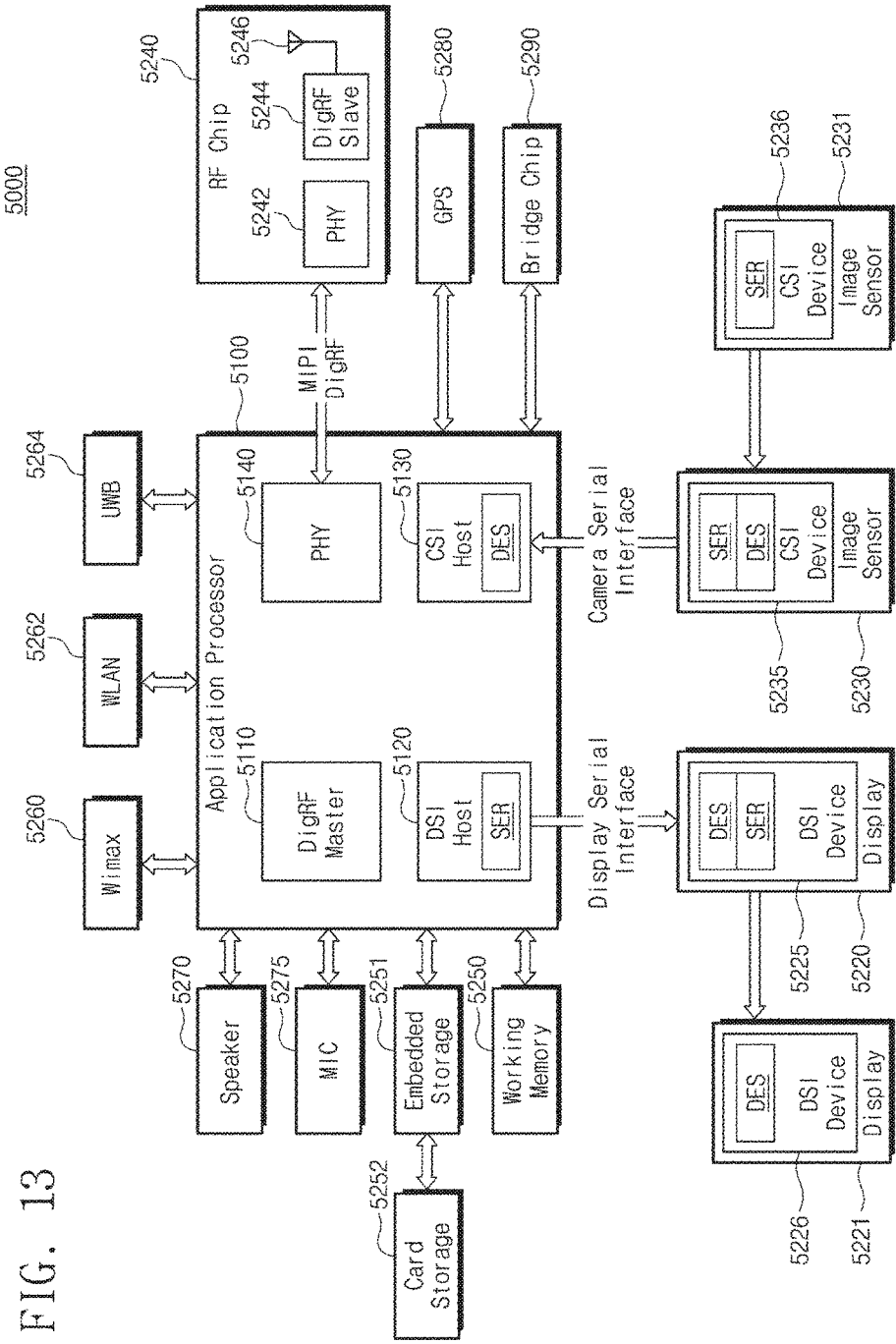
FIG. 13 is a block diagram illustrating an example configuration of an electronic device and interfaces thereof according to some example embodiments.

FIG. 13 is a block diagram illustrating an example configuration of an electronic device and interfaces thereof according to some example embodiments. An electronic device 5000 may be, for example, implemented with a data processing device which is capable of using or supporting an interface protocol proposed by mobile industry processor interface (MIPI) alliance. For example, the electronic device 5000 may be one of electronic devices such as a portable communication terminal, a personal digital assistant (PDA), a portable media player (PMP), a smart phone, a tablet computer, a wearable device, and/or the like.

The electronic device 5000 may include an application processor 5100, displays 5220 and 5221, and image sensors 5230 and 5231. The application processor 5100 may include a DigRF master 5110, a display serial interface (DSI) host 5120, a camera serial interface (CSI) host 5130, and/or a physical layer 5140.

The DSI host 5120 may communicate with a DSI device 5225 of the display 5220 in compliance with DSI. For example, a serializer SER may be implemented in the DSI host 5120, and a deserializer DES may be implemented in the DSI device 5225. The display 5220 may communicate with a DSI device 5226 of the display 5221 in compliance with DSI. For example, a serializer SER may be further implemented in the DSI device 5225, and a deserializer DES may be implemented in the DSI device 5226.

Meanwhile, the display 5221 may not be directly connected with the application processor 5100. Thus, the application processor 5100 may communicate with the DSI device 5226 of the display 5221 through the display 5220. The display 5220 may perform various compensation operations to compensate different characteristics of the application processor 5100, the display 5220, and the display 5221.

The CSI host 5130 may communicate with a CSI device 5235 of the image sensor 5230 in compliance with CSI. For example, a deserializer DES may be implemented in the CSI host 5130, and a serializer SER may be implemented in the CSI device 5235. The image sensor 5230 may communicate with a CSI device 5236 of the image sensor 5231 in compliance with CSI. A deserializer DES may be further implemented in the CSI device 5235, and a serializer SER may be implemented in the CSI device 5236.

Meanwhile, the image sensor 5231 may not be directly connected to the application processor 5100. Thus, the application processor 5100 may communicate with the CSI device 5236 of the image sensor 5231 through the image sensor 5230. The image sensor 5230 may perform various compensation operations to compensate different characteristics of the image sensor 5231, the image sensor 5230, and the application processor 5100.

The electronic device 5000 may further include a radio frequency (RF) chip 5240 that communicates with the application processor 5100. The RF chip 5240 may include a physical layer 5242, a DiRF slave 5244, and an antenna 5246. For example, the physical layer 5242 of the RF chip 5240 and the physical layer 5140 of the application processor 5100 may exchange data with each other in compliance with DiRF interface proposed by the MIPI alliance.

The electronic device 5000 may further include a working memory 5250, an embedded storage device 5251, and card storage device 5252. The working memory 5250, the embedded storage device 5251, and the card storage device 5252 may store or output data for the application processor 5100.

The working memory 5250 may temporarily store data processed or to be processed by the application processor 5100. The working memory 5250 may include a volatile memory such as a static random access memory (SRAM), a dynamic RAM (DRAM), a synchronous DRAM (SDRAM), and/or the like, and/or a nonvolatile memory such as a flash memory, a PRAM, a MRAM, a ReRAM, a FRAM, and/or the like.

The embedded storage device 5251 and the card storage device 5252 may store data regardless of whether power is supplied. For example, the embedded storage device 5251 and the card storage device 5252 may correspond to the embedded storage device 2300 and the removable storage device 2400 of FIG. 2 respectively.

The electronic device 5000 may communicate with an external device/system through a communication module such as worldwide interoperability for microwave access (Wimax) 5260, wireless local area network (WLAN) 5262, ultra-wideband (UWB) 5264, and/or the like. Besides, the electronic device 5000 may communicate with an external device/system in compliance with at least one of various wireless communication protocols such as long term evolution (LTE), global system for mobile communication (GSM), code division multiple access (CDMA), Bluetooth, near field communication (NFC), wireless fidelity (WiFi), radio frequency identification (RFID), and/or the like, and/or at least one of various wired communication protocols such as transfer control protocol/Internet protocol (TCP/IP), USB, SCSI, mobile PCIe (M-PCIe), Firewire, and/or the like.

The electronic device 5000 may further include a speaker 5270 and a microphone 5275 for processing voice information. Further, the electronic device 5000 may further include a global positioning system (GPS) device 5280 for processing position information. The electronic device 5000 may further include a bridge chip 5290 for managing connection with peripheral devices.

The above descriptions are specific example embodiments for implementing the inventive concepts. The inventive concepts may include not only the above-described example embodiments but also other embodiments which may be obtained by simply modifying or easily changing a design. The inventive concepts may also include technologies that may be implemented by modification based on the above-described embodiments in the future.

What is claimed is:

1. An electronic device comprising:
an embedded storage device configured to connect to a removable storage device and configured to directly communicate with the removable storage device, the removable storage device configured to process a packet having a first characteristic, the embedded storage device configured to process a packet having a second characteristic; and
a processor connected to the embedded storage device and not directly connected to the removable storage device, the processor configured to directly communicate with the embedded storage device, the processor configured to process a packet having a third characteristic,
wherein the embedded storage device is further configured to compensate at least one of the first characteristic or the second characteristic, such that at least one of a first packet of the first characteristic received from the removable storage device or a second packet of the second characteristic in the embedded storage device is provided to the processor according to the third characteristic.

2. The electronic device of claim 1, wherein:
the first characteristic is associated with a first number of first data write request packets generated by the removable storage device,
the second characteristic is associated with a second number of second data write request packets generated by the embedded storage device,
the third characteristic is associated with a third number of data write request packets supported by the processor, and
the embedded storage device is further configured to manage transmission of the first data write request packets and the second data write request packets to the processor, such that a sum of a fourth number of third data write request packets and a fifth number of fourth data write request packets is not greater than the third number, the third data write request packets provided to the processor through the embedded storage device from among the first data write request packets, the fourth data write request packets provided to the processor from among the second data write request packets.

3. The electronic device of claim 2, wherein:
when a sum of the first number and the second number is greater than the third number, the embedded storage device is further configured to buffer at least one of a first portion of the first data write request packets or a second portion of the second data write request packets, the first portion being other than the third data write request packets, the second portion being other than the fourth data write request packets.

4. The electronic device of claim 3, wherein:
when the sum of the fourth number and the fifth number is smaller than the third number, the embedded storage device is further configured to provide the processor with at least one of the buffered first portion and the buffered second portion.

5. The electronic device of claim 1, wherein:
the first characteristic is associated with a first unit size of a first data portion which corresponds to one header portion in the first packet,
the second characteristic is associated with a second unit size of a second data portion which corresponds to one header portion in the second packet,
the third characteristic is associated with a third unit size of a data portion which corresponds to one header portion in a packet processed by the processor, and
the embedded storage device is further configured to reconfigure at least one of the first data portion or the second data portion and a corresponding header portion, such that a data portion corresponding to one header portion in at least one of the first packet or the second packet has the third unit size.

6. The electronic device of claim 5, wherein:
when the first or second unit size is greater than the third unit size, the embedded storage device is further configured to,
divide the first or second data portion into a plurality of new data portions, at least one of the plurality of new data portions having the third unit size,
generate a plurality of new header portions corresponding to the plurality of new data portions, respectively, and
provide a plurality of reconfigured packets to the processor, at least one of the plurality of reconfigured packets including one of the plurality of new data portions and a corresponding one of the plurality of new header portions.

7. The electronic device of claim 5, wherein:
when the first or second unit size is smaller than the third unit size, the embedded storage device is further configured to,
buffer the first or second packet and one or more packets which follows the first or second packet, until the first or second data portion and data portions of the one or more packets are accumulated as much as the third unit size,
combine the first or second data portion and the data portions of the one or more packets which are accumulated as much as the third unit size, into one data portion,
generate a new header portion corresponding to the combined data portion, and
provide the processor with a reconfigured packet including the combined data portion and the new header portion.

8. The electronic device of claim 1, wherein:
the first characteristic indicates that a sequence of data of packets output from the removable storage device is out-of-order,
the second characteristic indicates that a sequence of data of packets output from the embedded storage device is out-of-order, the third characteristic indicates that a sequence of data of packets processed by the processor is in-order, and the embedded storage device is further configured to,
align an out-of-order sequence of at least one of first data associated with the first packet or second data associated with the second packet to an in-order sequence, and
provide the processor with at least one of the aligned first data or the aligned second data.

9. The electronic device of claim 1, wherein:
the embedded storage device is further configured to compensate the third characteristic, such that a third packet of the third characteristic received from the processor is transferred to the removable storage device according to the first characteristic or is processed in the embedded storage device according to the second characteristic.

10. The electronic device of claim 9, wherein:
the first characteristic is associated with first identifiers of first memory areas which are included in the removable storage device,
the second characteristic is associated with second identifiers of second memory areas which are included in the embedded storage device,
the third characteristic is associated with third identifiers of the first and second memory areas managed by the processor, and
the embedded storage device is further configured to map one of the third identifiers indicated by the third packet to a corresponding one of the first and second identifiers, based on a correspondence relationship between the first and second identifiers and the third identifiers.

11. The electronic device of claim 10, wherein:
when the one of the third identifiers indicated by the third packet is mapped to one of the first identifiers, the embedded storage device is further configured to transfer the third packet to the removable storage device, and
when the one of the third identifiers indicated by the third packet is mapped to one of the second identifiers, the embedded storage device is further configured to process the third packet in the embedded storage device.

12. The electronic device of claim 1, wherein:
the embedded storage device is further configured to,
receive fourth packets and fifth packets from the processor, the fourth packets for transfer to the removable storage device, the fifth packets for processing in the embedded storage device,
transfer the fourth packets to the removable storage device more frequently than processing the fifth packets, when first throughput of the removable storage device is higher than second throughput of the embedded storage device, and
process the fifth packets more frequently than transferring the fourth packets to the removable storage device, when the first throughput is lower than the second throughput.

13. The electronic device of claim 1, wherein:
the embedded storage device is configured to,
receive a sixth packet and a seventh packet from the processor, the sixth packet for transfer to the removable storage device, the seventh packet for processing in the embedded storage device,
transfer the sixth packet to the removable storage device before processing the seventh packet regardless of reception order of the sixth and seventh packets, when a first priority for the sixth packet is higher than a second priority for the seventh packet, and
process the seventh packet before transferring the sixth packet to the removable storage device regardless of the reception order of the sixth and seventh packets, when the first priority is lower than the second priority.

14. A storage device comprising:
a controller configured to,
directly communicate with a host device and with an external storage device, the host device and the external storage device not being directly connected to each other, and
process at least one first packet having a first characteristic;
a nonvolatile memory configured to store or output data according to control of the controller; and
a compensation circuit configured to compensate a difference among the first characteristic, a second characteristic of at least one second packet processed by the host device, and a third characteristic of at least one third packet processed by the external storage device, such that the at least one second packet of the second characteristic received from the host device is transferred to the external storage device according to the third characteristic or is processed by the controller according to the first characteristic.

15. The storage device of claim 14, wherein
the compensation circuit is further configured to collect information associated with at least one of the first characteristic, the second characteristic, and the third characteristic during at least one of a booting operation or in real time.

16. An electronic system comprising:
a plurality of electronic devices, the plurality of electronic devices connected to one another and configured to communicate with one another, the plurality of electronic devices including an interfacing electronic device, a designated electronic device, and a tail electronic device, the tail electronic device directly connected to one of the plurality of electronic devices and not directly connected to others of the plurality of electronic devices; and
a processor directly connected to the tail electronic device and configured to communicate with the interfacing electronic device,
the interfacing electronic device configured to process a packet having a first characteristic, the designated electronic device configured to process a packet having a second characteristic, the processor configured to process a packet having a third characteristic, wherein
the designated electronic device is further configured to compensate at least one of the first characteristic or the second characteristic, such that at least one of a first packet of the first characteristic received from the interfacing electronic device or a second packet of the second characteristic from the designated electronic device is provided to the processor according to the third characteristic.

17. The electronic system of claim 16, wherein the plurality of electronic devices are serially connected to one another.

18. The electronic device of claim 16, wherein the designated electronic device is the tail electronic device.

19. The electronic device of claim 16, wherein the processor is not directly connected to the designated electronic device.

20. The electronic device of claim 16, wherein interfacing electronic device is directly connected to the designated electronic device.

* * * * *